United States Patent
Huang et al.

(10) Patent No.: US 11,138,362 B2
(45) Date of Patent: *Oct. 5, 2021

(54) INTEGRATED CIRCUIT LAYOUT METHOD AND SYSTEM

(71) Applicant: TAIWAN SEMICONDUCTOR MANUFACTURING COMPANY, LTD., Hsinchu (TW)

(72) Inventors: Po-Hsiang Huang, Tainan (TW); Sheng-Hsiung Chen, Zhubei (TW); Fong-Yuan Chang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,759

(22) Filed: Sep. 11, 2020

(65) Prior Publication Data

US 2020/0410154 A1    Dec. 31, 2020

Related U.S. Application Data

(60) Continuation of application No. 16/205,039, filed on Nov. 29, 2018, now Pat. No. 10,776,557, which is a (Continued)

(51) Int. Cl.
*G06F 30/398* (2020.01)
*H01L 27/02* (2006.01)
(Continued)

(52) U.S. Cl.
CPC .............. *G06F 30/398* (2020.01); *G03F 1/36* (2013.01); *G06F 30/392* (2020.01);
(Continued)

(58) Field of Classification Search
None
See application file for complete search history.

(56) References Cited

U.S. PATENT DOCUMENTS 6,691,290 B1    2/2004 Wu
7,853,909 B2   12/2010 Kobayashi et al.
(Continued)

FOREIGN PATENT DOCUMENTS

| JP | 2016042568 | 3/2016 |
| KR | 20160039531 | 4/2016 |
| TW | 201608404 | 3/2016 |
| TW | 201705407 | 2/2017 |

OTHER PUBLICATIONS

Design Rules MOSIS (Year: 2009).
(Continued)

*Primary Examiner* — Whitney Moore
(74) *Attorney, Agent, or Firm* — Hauptman Ham, LLP

(57) ABSTRACT

A method of updating a boundary space configuration of an IC layout cell includes identifying a pin in the IC layout cell as a boundary pin, determining that a boundary spacing of the boundary pin is capable of being increased, and based on the determination that the boundary spacing of the boundary pin is capable of being increased, modifying the IC layout cell by increasing the boundary spacing of the boundary pin. At least one of the identifying, determining, or modifying is executed by a processor of a computer.

20 Claims, 13 Drawing Sheets

Related U.S. Application Data division of application No. 15/878,009, filed on Jan. 23, 2018, now Pat. No. 10,402,534.

(60) Provisional application No. 62/565,005, filed on Sep. 28, 2017.

(51) Int. Cl.
  *G03F 1/36* (2012.01)
  *H01L 27/118* (2006.01)
  *G06F 30/392* (2020.01)
  *G06F 30/394* (2020.01)
  *G06F 111/04* (2020.01)
  *G06F 119/18* (2020.01)

(52) U.S. Cl.
  CPC ........ *G06F 30/394* (2020.01); *H01L 27/0207* (2013.01); *H01L 27/11807* (2013.01); *G06F 2111/04* (2020.01); *G06F 2119/18* (2020.01); *H01L 2027/11875* (2013.01)

(56) References Cited

U.S. PATENT DOCUMENTS

| | | | |
|---|---|---|---|
| 8,677,292 | B2 | 3/2014 | Fu et al. |
| 2009/0019413 | A1* | 1/2009 | Kobayashi ............ G06F 30/392 |
| | | | 716/119 |
| 2009/0307640 | A1* | 12/2009 | Chapman .............. G06F 30/398 |
| | | | 716/136 |
| 2010/0050140 | A1* | 2/2010 | Chang ................. G06F 30/3312 |
| | | | 716/113 |
| 2015/0143309 | A1 | 5/2015 | De Dood et al. |
| 2015/0179568 | A1 | 6/2015 | Chang et al. |
| 2018/0096092 | A1* | 4/2018 | Kim ...................... G06F 30/394 |

OTHER PUBLICATIONS

Office Action dated Jul. 6, 2018 from corresponding application No. TW 107112532.
Notice of Allowance dated Sep. 23, 2019 and English translation from corresponding application No. KR 10-2018-0058890.

* cited by examiner

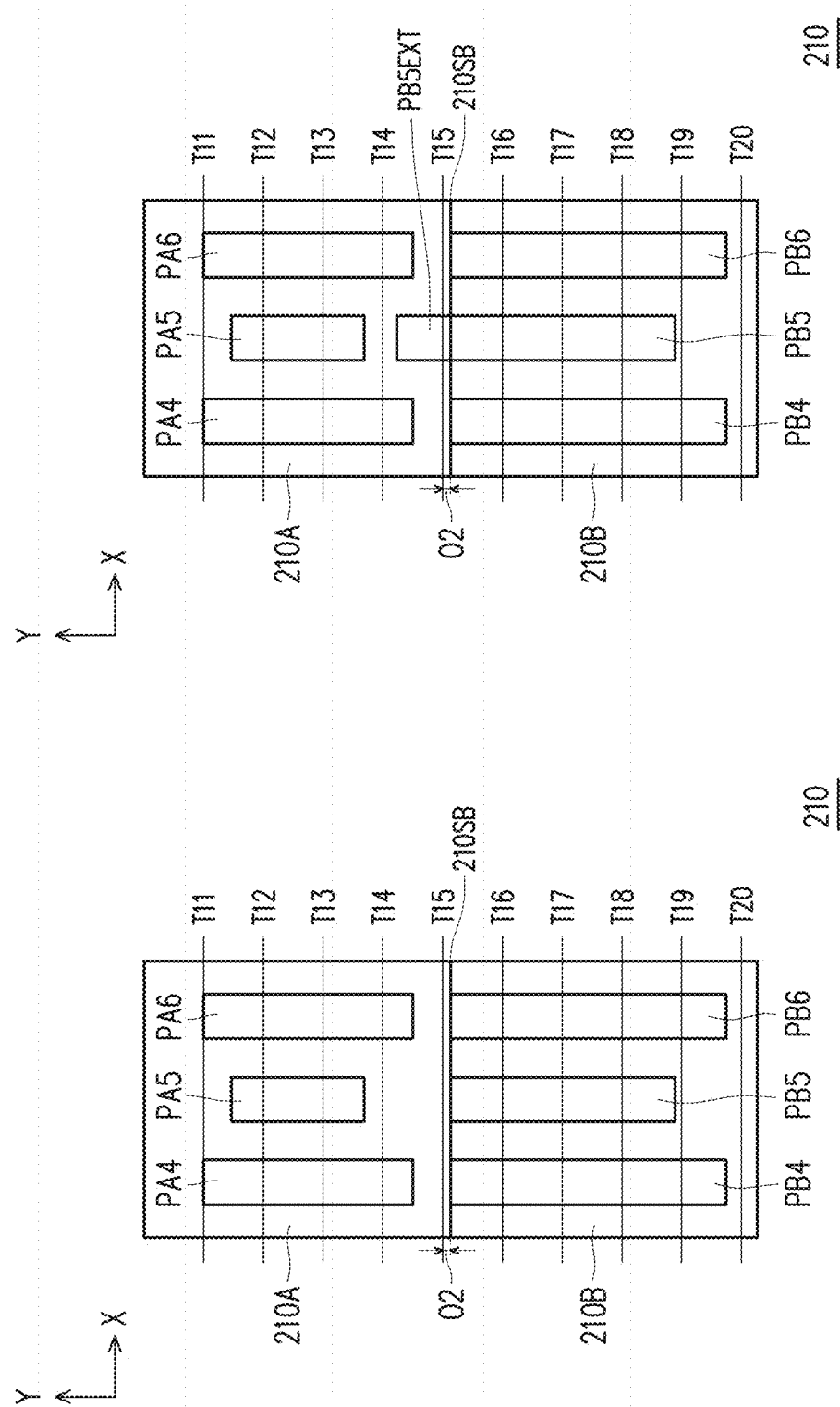

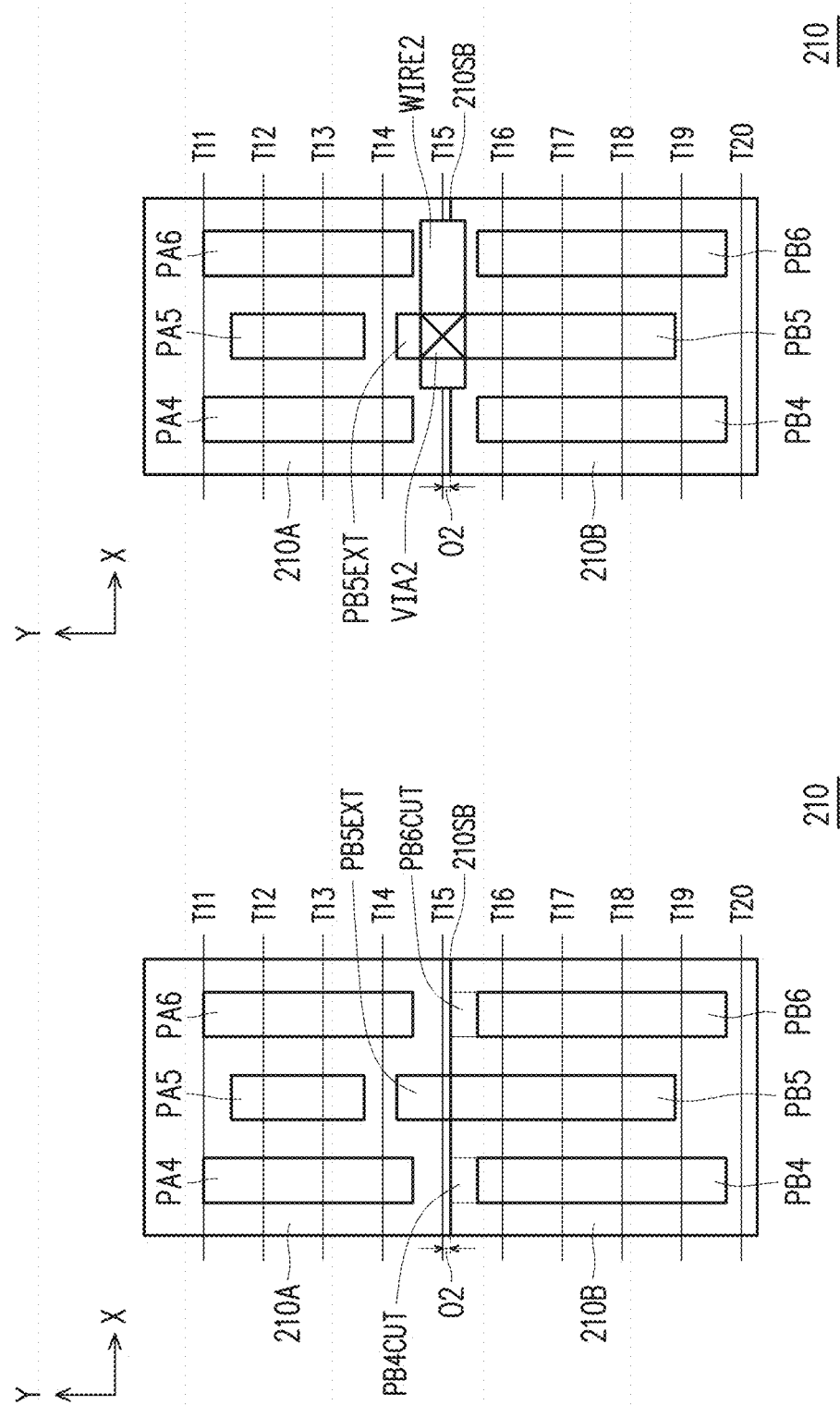

INTEGRATED CIRCUIT LAYOUT METHOD AND SYSTEM

The present application is a continuation of U.S. application Ser. No. 16/205,039, filed Nov. 29, 2018, which is a divisional of U.S. application Ser. No. 15/878,009, filed Jan. 23, 2018, now U.S. Pat. No. 10,402,534, issued Sep. 3, 2019, which claims the priority of U.S. Provisional Application No. 62/565,005, filed Sep. 28, 2017, which are incorporated herein by reference in their entireties.

BACKGROUND

An integrated circuit (IC) typically includes a number of semiconductor devices. One way to represent a semiconductor device is with a plan view diagram referred to as a layout diagram, or IC layout. An IC layout is hierarchical and includes modules which carry out higher-level functions in accordance with the semiconductor device's design specifications. The modules are often built from a combination of cells that can include both standard and custom cells, each of which represents one or more semiconductor structures.

Standard cells include logic devices configured to provide common, lower-level logic functions, and have at least one dimension which is the same size in order to facilitate placement into a layout. Typically, the direction of the fixed dimension is parallel to a vertical direction such that the fixed dimension is referred to as a height of the standard cell. Custom cells may or may not have at least one dimension that is the same size as the corresponding dimension of the standard cell.

To enable routing to interconnect structures to form higher-level IC modules, both standard and custom cells include conductive pins, the number of pins per cell depending on the logic function(s) being provided by the cell.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2F-2J are depictions of an IC layout at various stages of generating the IC layout, in accordance with some embodiments.

DETAILED DESCRIPTION

Figure 1:
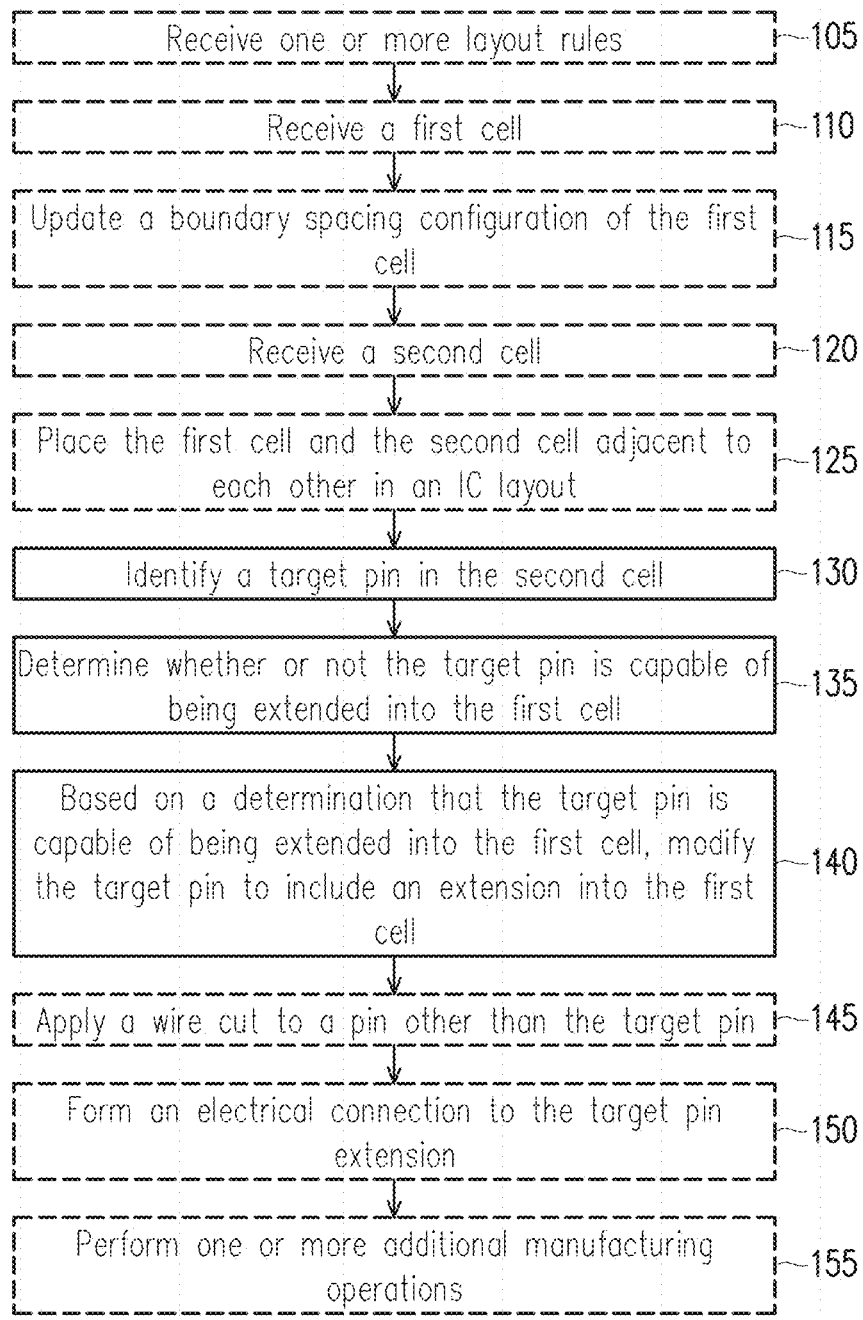
FIG. 1 is a flowchart of a method of generating a layout of an IC, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, generating an IC layout includes identifying a target pin in a first cell, the first cell sharing a boundary with a second cell, determining whether or not the target pin is capable of being extended into the second cell, and, based on a determination that the target pin is capable of being extended into the second cell, modifying the target pin to include an extension into the second cell. A semiconductor structure formed thereby includes the target pin positioned within regions defined by the first and second cells.

The extended target pin is capable of having an electrical connection to a metal wire positioned along a track on or near the shared boundary. This electrical connection enables the first cell to have a greater number of electrical connections than a same-size cell that is not capable of having an electrical connection to a metal wire positioned along a track on or near a cell boundary. The overall routing flexibility for the semiconductor device is thereby increased without increasing cell size as compared to approaches in which a cell is not capable of having an electrical connection to a metal wire positioned along a track on or near a cell boundary.

FIG. 1 is a flowchart of a method 100 of generating a layout of an IC, in accordance with some embodiments. The operations of method 100 are capable of being performed as part of a method of forming a semiconductor structure. In some embodiments, forming the semiconductor structure is part of forming one or more semiconductor devices, non-limiting examples of which include memory circuits, logic devices, processing devices, signal processing circuits, and the like.

In some embodiments, some or all of the operations of method 100 are capable of being performed as part of an automated placement and routing (APR) method. In some embodiments, some or all of the operations of method 100 are capable of being performed by an APR system.

In some embodiments, the operations of method 100 are performed in the order depicted in FIG. 1. In some embodiments, the operations of method 100 are performed in an order other than the order depicted in FIG. 1. In some embodiments, one or more operations are performed before, between, during, and/or after performing one or more operations of method 100.

In some embodiments, some or all of method 100 is executed by a processor of a computer. In some embodiments, some or all of method 100 is executed by a processor 802 of an IC layout generation system 800, discussed below with respect to FIG. 8.

FIGS. 2A-2E are depictions of a first non-limiting example of an IC layout 200 at various stages of generating IC layout 200 by executing one or more operations of method 100, in some embodiments. FIGS. 2F-2J are depictions of a second non-limiting example of an IC layout 210 at various stages of generating IC layout 210 by executing one or more operations of method 100, in some embodiments. IC layouts 200 and 210 are simplified for the purpose of clarity. In various embodiments, one or both of IC layouts 200 or 210 includes features in addition to those depicted in FIGS. 2A-2J, e.g., one or more transistor elements, power rails, isolation structures, or the like. Each of FIGS. 2A-2J further depicts horizontal direction X and vertical direction Y.

At optional operation 105, in some embodiments, one or more layout rules are received. In some embodiments, receiving the one or more layout rules includes receiving one or more electronic files containing data usable by an IC manufacturing system as part of an IC manufacturing flow, e.g., IC manufacturing system 900, discussed below with respect to FIG. 9.

In some embodiments, receiving the one or more layout rules includes receiving the one or more layout rules from a layout rule storage device. In some embodiments, receiving the one or more layout rules includes receiving layout rules 820 of IC layout generation system 800, discussed below with respect to FIG. 8.

In some embodiments, receiving the one or more layout rules includes receiving the one or more layout rules over a network. In some embodiments, receiving the one or more layout rules includes receiving the one or more layout rules over network 814 of IC layout generation system 800, discussed below with respect to FIG. 8.

At optional operation 110, in some embodiments, a first cell is received. In some embodiments, the first cell is a layout of a standard cell. In some embodiments, the first cell is a layout of an engineering change order (ECO) cell. In some embodiments, the first cell is a layout of a logic cell. In some embodiments, the first cell is a layout of a memory cell. In some embodiments, the first cell is a layout of a custom cell.

In some embodiments, receiving the first cell includes receiving one or more layouts 822 of IC layout generation system 800, discussed below with respect to FIG. 8.

In some embodiments, receiving the first cell includes receiving one or more electronic files containing data usable by an IC manufacturing system as part of an IC manufacturing flow, e.g., IC manufacturing system 900, discussed below with respect to FIG. 9.

In some embodiments, receiving the first cell includes receiving the first cell from a cell library. In some embodiments, receiving the first cell includes receiving the first cell over a network. In some embodiments, receiving the first cell includes receiving the first cell over network 814 of IC layout generation system 800, discussed below with respect to FIG. 8.

The first cell includes an active area, also referred to as an oxide diffusion (OD) region, a gate, and a pin, also referred to as a conductive structure. The active area and gate are part of a transistor capable of preforming a switching or logic function. The pin is electrically connected to the active area and/or the gate.

In some embodiments, the first cell includes features in addition to the active area, gate, and pin. In some embodiments, the active area is one active area of a plurality of active areas in the first cell. In some embodiments, the gate is one gate of a plurality of gates in the first cell. In some embodiments, the pin is one pin of a plurality of pins in the first cell.

In some embodiments, the active area and gate are part of a planar transistor in the first cell. In some embodiments, the active area and gate are part of a fin, field-effect transistor (FinFET) in the first cell. In some embodiments, the active area and gate are part of a plurality of transistors in the first cell.

In some embodiments, the pin is a metal zero structure. In some embodiments, the pin includes one or more metal-zero-over-oxide-layers configured to provide one or more electrical connections by contacting the active area. In some embodiments, the pin includes one or more metal-zero-over-poly-layers configured to provide one or more electrical connections by contacting the gate.

In some embodiments, receiving the first cell includes receiving the first cell having a metal zero cut at one or more boundaries of the cell so that no pin abuts the one or more boundaries. In some embodiments, receiving the first cell includes receiving the first cell being free from a metal zero cut at one or more boundaries of the cell so that at least one pin abuts the one or more boundaries.

At optional operation 115, in some embodiments, a boundary spacing configuration of the first cell is updated. In some embodiments, operation 115 is performed prior to operation 110, and the first cell is received after a boundary spacing configuration of the first cell has been updated.

In some embodiments, updating the boundary spacing configuration of the first cell includes increasing a spacing between the pin and a boundary of the first cell. In some embodiments, updating the boundary spacing configuration of the first cell includes performing one or more operations of method 300, discussed below with respect to FIG. 3.

Figure 2A:
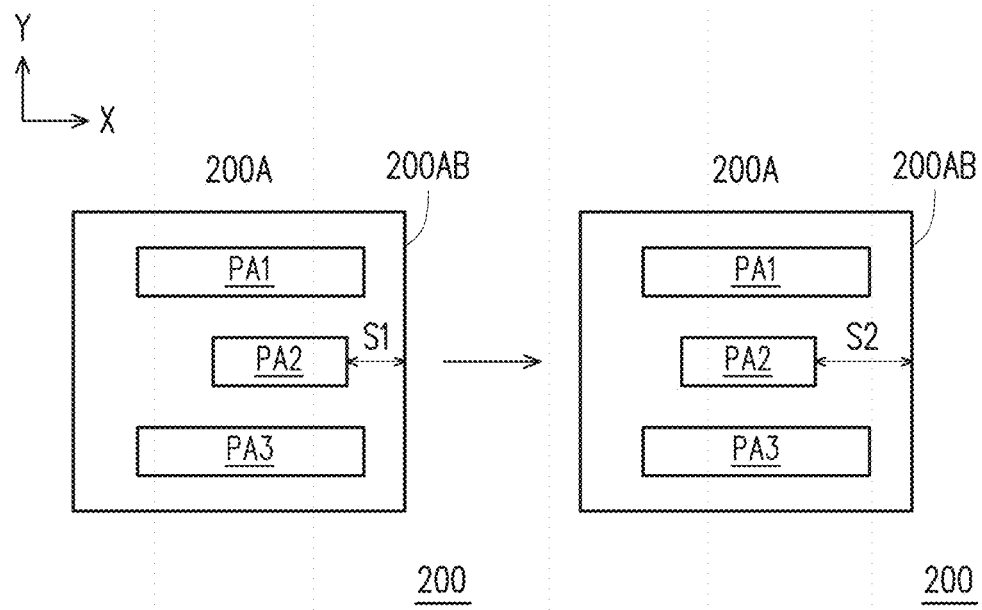
FIGS. 2A-2E are depictions of an IC layout at various stages of generating the IC layout, in accordance with some embodiments.

FIG. 2A depicts a non-limiting example of updating a boundary spacing configuration of a first cell 200A, in accordance with some embodiments. First cell 200A includes pins PA1, PA2, and PA3 and a boundary 200AB along the Y direction. As depicted on the left, an initial boundary spacing configuration of cell 200A includes a spacing S1 along the X direction between pin PA2 and boundary 200AB. As depicted on the right, an updated boundary spacing configuration of cell 200A includes a spacing S2 along the X direction between pin PA2 and boundary 200AB in which spacing S2 is greater than spacing S1.

In the embodiment depicted in FIG. 2A, updating the boundary spacing configuration of first cell 200A by including spacing S2 greater than spacing S1 corresponds to shifting pin PA2 leftward within first cell 200A. In some embodiments, updating the boundary spacing configuration of first cell 200A by including spacing S2 greater than spacing S1 corresponds to decreasing a size of pin PA2.

Figure 2B:
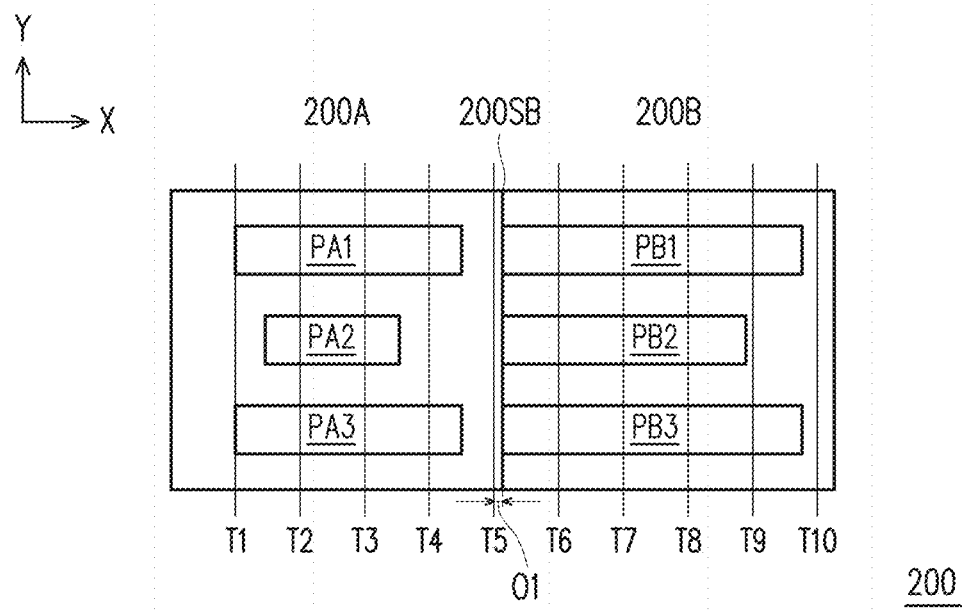
Figure 2C:
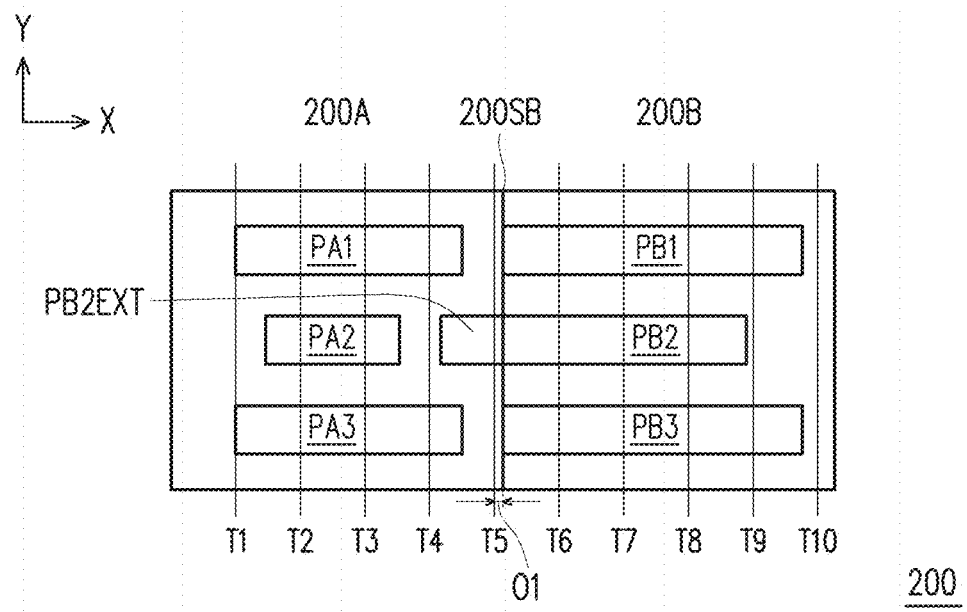
Figure 2D:
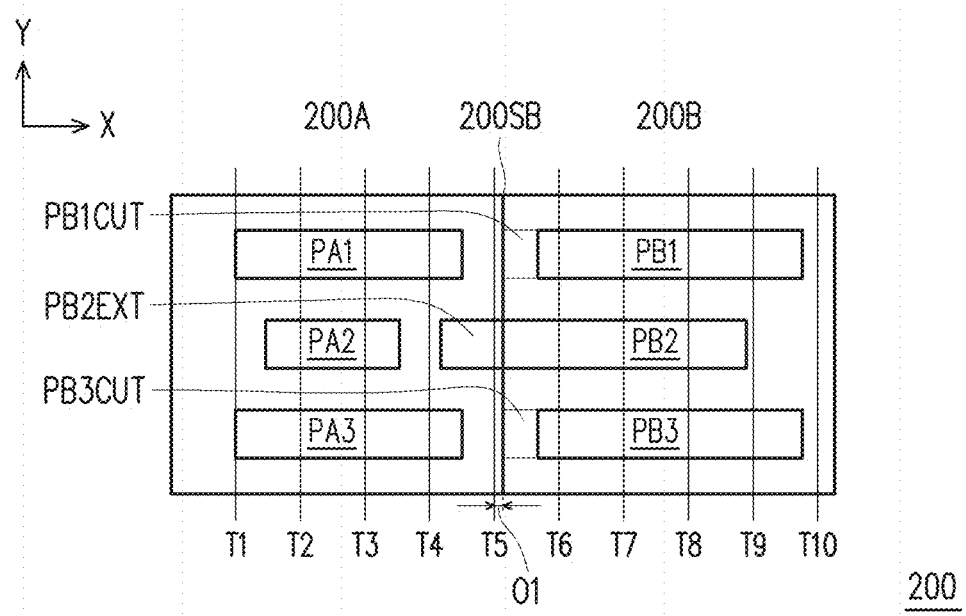
Figure 2E:
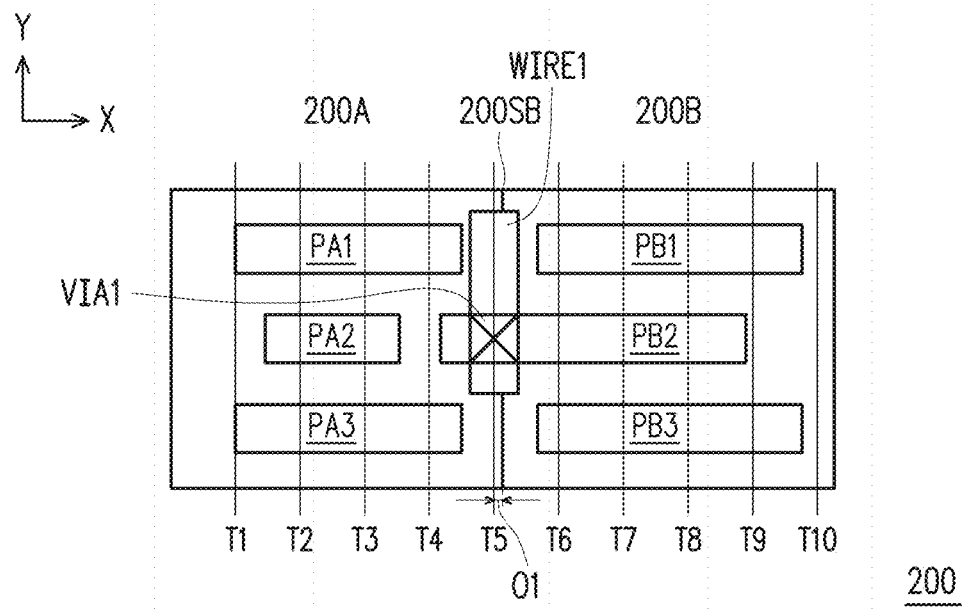
Figure 2F:
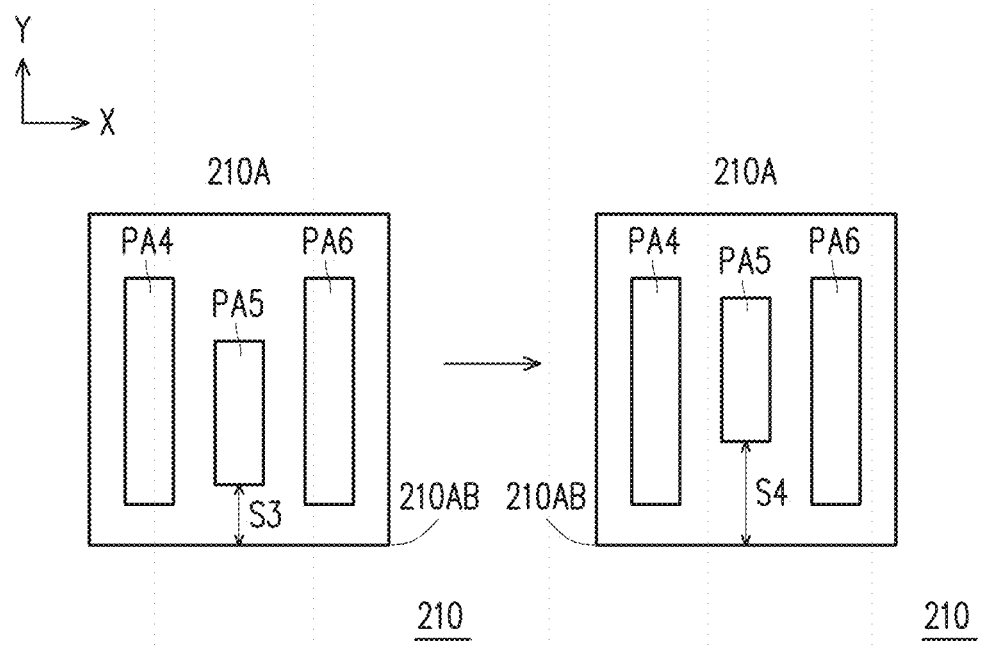

FIG. 2F depicts a non-limiting example of updating a boundary spacing configuration of a first cell 210A, in accordance with some embodiments. First cell 210A includes pins PA4, PA5, and PA6 and a boundary 210AB along the X direction. As depicted on the left, an initial boundary spacing configuration of cell 210A includes a spacing S3 along the Y direction between pin PA5 and boundary 210AB. As depicted on the right, an updated boundary spacing configuration of cell 210A includes a spacing S4 along the Y direction between pin PA5 and boundary 210AB in which spacing S4 is greater than spacing S3.

In the embodiment depicted in FIG. 2F, updating the boundary spacing configuration of first cell 210A by including spacing S4 greater than spacing S3 corresponds to shifting pin PA5 upward within first cell 210A. In some embodiments, updating the boundary spacing configuration of first cell 210A by including spacing S4 greater than spacing S3 corresponds to decreasing a size of pin PA5.

At optional operation 120, in some embodiments, a second cell is received. Receiving the second cell is performed in the manner described above for receiving the first cell at operation 110. In some embodiments, operations 110 and 120 are executed simultaneously, and the first and second cells are received together.

In some embodiments, receiving the second cell includes receiving one or more layouts 822 of IC layout generation system 800, discussed below with respect to FIG. 8.

At optional operation 125, in some embodiments, the first cell and the second cell are placed adjacent to each other in an IC layout, thereby forming a shared boundary. In some embodiments, placing the first cell adjacent to the second cell includes forming the shared boundary using the boundary corresponding to increasing the spacing at operation 115. In some embodiments, placing the first cell adjacent to the second cell includes forming the shared boundary using boundary 200AB of cell 200A, discussed above with respect to FIG. 2A. In some embodiments, placing the first cell adjacent to the second cell includes forming the shared boundary using boundary 210AB of cell 210A, discussed above with respect to FIG. 2F.

FIG. 2B depicts a non-limiting example of IC layout 200 including first cell 200A and a second cell 200B placed adjacent to each other, in accordance with some embodiments. First cell 200A and second cell 200B share boundary 200SB along the Y direction, formed using boundary 200AB of cell 200A, discussed above with respect to FIG. 2A. In addition to first cell 200A and second cell 200B, FIG. 2B depicts tracks T1-T10.

Second cell 200B includes pin PB1 aligned along the X direction with pin PA1 of first cell 200A, pin PB2 aligned along the X direction with pin PA2 of first cell 200A, and pin PB3 aligned along the X direction with pin PA2 of first cell 200A.

In the embodiment depicted in FIG. 2B, each of pins PB1, PB2, and PB3 abuts shared boundary 200SB. In some embodiments, one or more of pins PB1, PB2, or PB3 is offset along the X direction from shared boundary 200SB within second cell 200B so that the one or more of pins PB1, PB2, or PB3 does not abut shared boundary 200SB.

Tracks T1-T10 correspond to locations along the X direction at which vias are placed to form electrical connections to one or more of pins PA1, PA2, PA3, PB1, PB2, or PB3. In the embodiment depicted in FIG. 2B, based on the placement of first cell 200A and second cell 200B and the track locations, track T5 is the track nearest shared boundary 200SB.

In the embodiment depicted in FIG. 2B, track T5 is offset along the X direction from shared boundary 200SB by a distance O1 and overlies first cell 200A. In some embodiments, track T5 or another track closest to shared boundary 200SB is offset from shared boundary 200SB and overlies second cell 200B. In some embodiments, track T5 or another track closest to shared boundary 200SB is not offset from shared boundary 200SB and overlies shared boundary 200SB.

FIG. 2G depicts a non-limiting example of IC layout 210 including first cell 210A and a second cell 210B placed adjacent to each other, in accordance with some embodiments. First cell 210A and second cell 210B share boundary 210SB along the X direction, formed using boundary 210AB of cell 210A, discussed above with respect to FIG. 2F. In addition to first cell 210A and second cell 210B, FIG. 2G depicts tracks T11-T20.

Second cell 210B includes pin PB4 aligned along the Y direction with pin PA4 of first cell 210A, pin PB5 aligned along the Y direction with pin PA5 of first cell 210A, and pin PB6 aligned along the Y direction with pin PA6 of first cell 210A.

In the embodiment depicted in FIG. 2G, each of pins PB4, PB5, and PB6 abuts shared boundary 210SB. In some embodiments, one or more of pins PB4, PB5, or PB6 is offset along the Y direction from shared boundary 210SB within second cell 210B so that the one or more of pins PB4, PB5, or PB6 does not abut shared boundary 210SB.

Tracks T11-T20 correspond to locations along the Y direction at which vias are placed to form electrical connections to one or more of pins PA4, PA5, PA6, PB4, PB5, or PB6. In the embodiment depicted in FIG. 2G, based on the placement of first cell 210A and second cell 210B and the track locations, track T15 is the track nearest shared boundary 210SB.

In the embodiment depicted in FIG. 2G, track T15 is offset along the Y direction from shared boundary 210SB by a distance O2 and overlies first cell 210A. In some embodiments, track T15 or another track closest to shared boundary 210SB is offset from shared boundary 210SB and overlies second cell 210B. In some embodiments, track T15 or another track closest to shared boundary 210SB is not offset from shared boundary 210SB and overlies shared boundary 210SB.

At operation 130, a target pin is identified in the second cell. In some embodiments, identifying the target pin is based on an algorithm for determining routing of electrical connections to the second cell. In some embodiments, identifying the target pin is based on an iterative process in which pins in the second cell are sequentially identified. In some embodiments, identifying the target pin includes receiving an instruction from a user interface or network.

In some embodiments, identifying the target pin is based on positioning information for the one or more pins in the second cell. In some embodiments, identifying the target pin is based on positioning information for the one or more pins in the first cell. In some embodiments, identifying the target pin is based on a boundary spacing configuration of the first cell. In some embodiments, identifying the target pin is based on operation 115, in which the boundary spacing configuration of the first cell is updated.

At operation 135, a determination is made as to whether or not the target pin is capable of being extended into the first cell. Determining whether or not the target pin is capable of being extended into the first cell is based on location data for the target pin, the shared boundary, one or more features of the first cell aligned with the target pin and across the shared boundary from the target pin, and a track closest to the boundary.

In some embodiments, determining whether or not the target pin is capable of being extended into the first cell is based on location data 824 of IC layout generation system 800, discussed below with respect to FIG. 8.

In some embodiments, determining whether or not the target pin is capable of being extended into the first cell is based on positioning of one or more pins in the first cell. In some embodiments, determining whether or not the target pin is capable of being extended into the first cell includes performing one or more operations of method 500, discussed below with respect to FIG. 5.

In some embodiments, based on a determination that the target pin is not capable of being extended into the first cell, operation 130 is repeated to identify another target pin in the second cell.

At operation 140, based on a determination that the target pin is capable of being extended into the first cell, the target pin is modified to include an extension into the first cell so that the target pin crosses the shared border. Modifying the target pin to include an extension into the first cell includes adding the extension in accordance with the determining in operation 135 whether or not the target pin is capable of being extended into the first cell.

In some embodiments, because first and second cells include metal zero features, and modifying the target pin to include an extension into the first cell is performed after placement of the first and second cells into an IC layout, modifying the target pin to include an extension into the first cell is also referred to as post metal zero routing. In some embodiments, post metal zero routing is part of an APR method.

In some embodiments, modifying the target pin to include an extension into the first cell includes adding the extension having the length calculated using method 500 in operation 135. In some embodiments, modifying the target pin to include an extension into the first cell includes adding the extension having a length greater than the length calculated using method 500 in operation 135.

FIG. 2C depicts a non-limiting example of IC layout 200 in which pin PB2 has been modified to include extension PB2EXT. Extension PB2EXT causes pin PB2 to extend along the X direction from second cell 200B into first cell 200A, thereby crossing shared boundary 200SB.

In the embodiment depicted in FIG. 2C, extension PB2EXT underlies track T5. In some embodiments in which track T5 or another track closest to shared boundary 200SB overlies shared boundary 200SB or second cell 200B, extension PB2EXT does not underlie track T5 or the other track closest to shared boundary 200SB.

By including extension PB2EXT across shared boundary 200SB, pin PB2 is capable of having a greater number of routing connections than a pin that has not been extended across a cell boundary, thereby increasing routing flexibility without increasing cell size.

FIG. 2H depicts a non-limiting example of IC layout 210 in which pin PB5 has been modified to include extension PBSEXT. Extension PBSEXT causes pin PB5 to extend along the Y direction from second cell 210B into first cell 210A, thereby crossing shared boundary 210SB.

In the embodiment depicted in FIG. 2H, extension PBSEXT underlies track T15. In some embodiments in which track T15 or another track closest to shared boundary 210SB overlies shared boundary 210SB or second cell 210B, extension PBSEXT does not underlie track T15 or the other track closest to shared boundary 210SB.

By including extension PBSEXT across shared boundary 210SB, pin PB5 is capable of having a greater number of routing connections than a pin that has not been extended across a cell boundary, thereby increasing routing flexibility without increasing cell size.

At optional operation 145, in some embodiments, a wire cut is applied to a pin other than the target pin. In some embodiments, applying a wire cut includes applying a wire cut to one or more pins in the second cell other than the target pin. In some embodiments, applying a wire cut includes applying a wire cut to one or more pins in the first cell.

In some embodiments, applying a wire cut to a pin other than the target pin is part of a post metal zero routing operation. In some embodiments, applying a wire cut to a pin other than the target pin is part of a post metal zero routing operation of an APR method. In some embodiments, by being part of a post metal zero routing operation, applying a wire cut to a pin other than the target pin facilitates a routing flow by which routing flexibility is increased, as discussed above with respect to operation 140.

FIG. 2D depicts a non-limiting example of IC layout 200 in which a wire cut PB1CUT has been applied to pin PB1, thereby increasing a space along the X direction between pin PB1 and shared boundary 200SB, and a wire cut PB3CUT has been applied to pin PB3, thereby increasing a space along the X direction between pin PB3 and shared boundary 200SB.

In the embodiment depicted in FIG. 2D, wire cuts PB1CUT and PB3CUT are applied to second cell 200B at shared boundary 200SB. In various embodiments, one or more wire cuts are applied to one or both of first cell 200A or second cell 200B at one or more locations other than at shared boundary 200SB.

FIG. 2I depicts a non-limiting example of IC layout 210 in which a wire cut PB4CUT has been applied to pin PB4, thereby increasing a space along the Y direction between pin PB4 and shared boundary 210SB, and a wire cut PB6CUT has been applied to pin PB6, thereby increasing a space along the Y direction between pin PB6 and shared boundary 210SB.

In the embodiment depicted in FIG. 2I, wire cuts PB4CUT and PB6CUT are applied to second cell 210B at shared boundary 210SB. In various embodiments, one or more wire cuts are applied to one or both of first cell 210A or second cell 210B at one or more locations other than at shared boundary 210SB.

At optional operation 150, in some embodiments, an electrical connection is formed to the target pin extension. In some embodiments, forming the electrical connection includes forming the electrical connection located at a track closest to the shared boundary.

In some embodiments, forming the electrical connection includes forming the electrical connection overlying the shared boundary. In some embodiments, forming the electrical connection includes forming the electrical connection overlying both of the first cell and the second cell. In some embodiments, forming the electrical connection includes forming the electrical connection overlying only one of the first cell or the second cell.

In some embodiments, forming the electrical connection includes forming a via overlying and contacting the target pin extension. In some embodiments, forming the electrical connection includes forming a via in a via zero layer.

In some embodiments, forming the electrical connection includes forming a metal wire overlying and contacting the via. In some embodiments, forming the electrical connection includes forming a metal wire in a metal one layer.

FIG. 2E depicts a non-limiting example of IC layout 200 in which a via VIA1 overlies and contacts extension PB2EXT and a metal wire WIRE1 overlies and contacts via VIA1 In the embodiment depicted in FIG. 2E, via VIA1 and metal wire WIRE1 have a same width (not labeled) and extend along extension PB2EXT in the X direction for a same distance. In some embodiments, metal wire WIRE1 is wider than via VIA1 and extends along extension PB2EXT in the X direction for a distance greater than a distance that via VIA1 extends along extension PB2EXT in the X direction.

In the embodiment depicted in FIG. 2E, each of via VIA1 and metal wire WIRE1 overlies first cell 200A, shared boundary 200SB, and second cell 200B. In some embodiments, metal wire WIRE1 overlies second cell 200B and via VIA1 does not overlie second cell 200B. In some embodiments, metal wire WIRE1 overlies first cell 200B and via VIA1 does not overlie first cell 200B.

FIG. 2J depicts a non-limiting example of IC layout 210 in which a via VIA2 overlies and contacts extension PB5EXT and a metal wire WIRE2 overlies and contacts via VIA2. In the embodiment depicted in FIG. 2J, via VIA2 and metal wire WIRE2 have a same width (not labeled) and extend along extension PB5EXT in the Y direction for a same distance. In some embodiments, metal wire WIRE2 is wider than via VIA2 and extends along extension PB5EXT in the Y direction for a distance greater than a distance that via VIA2 extends along extension PB5EXT in the Y direction.

In the embodiment depicted in FIG. 2J, each of via VIA2 and metal wire WIRE2 overlies first cell 210A, shared boundary 210SB, and second cell 210B. In some embodiments, metal wire WIRE2 overlies second cell 210B and via VIA2 does not overlie second cell 210B. In some embodiments, metal wire WIRE2 overlies first cell 210B and via VIA2 does not overlie first cell 210B.

At optional operation 155, in some embodiments, based on the IC layout, one or more additional manufacturing operations are performed. In some embodiments, performing one or more additional manufacturing operations includes generating one or more files representing the IC layout. In some embodiments, performing one or more additional manufacturing operations includes generating one or more sets of masks usable to manufacture one or more semiconductor structures.

In some embodiments, performing one or more additional manufacturing operations includes updating and/or storing one or more cells in a cell library. In some embodiments, performing one or more additional manufacturing operations includes updating and/or storing one or more routing algorithms.

By executing the operations of method 100, the target pin is capable of having an electrical connection to a metal wire positioned along a track on or near the shared boundary. This electrical connection enables the second cell to have a greater number of electrical connections than a same-size cell that is not capable of having an electrical connection to a metal wire positioned along a track on or near a cell boundary.

By routing an electrical connection to the target pin, space that would otherwise be used for an electrical connection to another second cell pin location is made available for routing of electrical connections to other nearby cells, e.g., cells above or below the second. Overall routing flexibility for the semiconductor structure is thereby increased without increasing cell size as compared to approaches in which a cell is not capable of having an electrical connection to a metal wire positioned along a track on or near a cell boundary.

Figure 3:
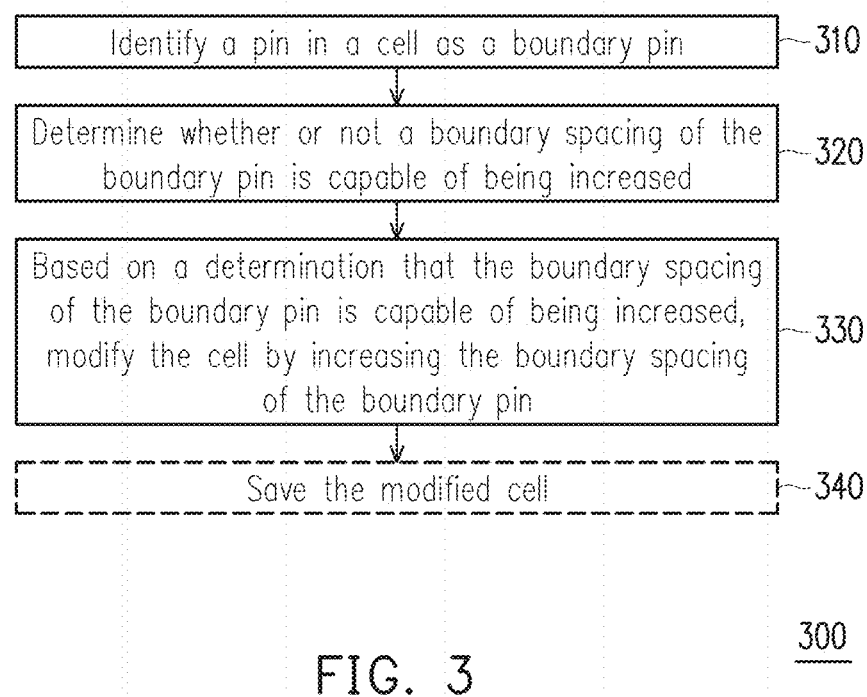
FIG. 3 is a flowchart of a method of updating a boundary spacing configuration of a cell, in accordance with some embodiments.

FIG. 3 is a flowchart of a method 300 of updating a boundary spacing configuration of a cell, in accordance with some embodiments. Method 300 is usable as one or more of operation 115 of method 100, discussed above with respect to FIGS. 1-2J, or operations 520 or 540 of method 500, discussed below with respect to FIGS. 5 and 6.

The operations of method 300 are capable of being performed as part of a method of forming a semiconductor structure. In some embodiments, forming the semiconductor structure is part of forming one or more semiconductor devices, non-limiting examples of which include memory circuits, logic devices, processing devices, signal processing circuits, and the like.

In some embodiments, some or all of the operations of method 300 are capable of being performed as part of an APR method. In some embodiments, some or all of the operations of method 300 are capable of being performed by an APR system.

In some embodiments, the operations of method 300 are performed in the order depicted in FIG. 3. In some embodiments, the operations of method 300 are performed in an order other than the order depicted in FIG. 3. In some embodiments, one or more operations are performed before, between, during and/or after performing one or more operations of method 300.

In some embodiments, some or all of method 300 is executed by a processor of a computer. In some embodiments, some or all of method 300 is executed by a processor 802 of IC layout generation system 800, discussed below with respect to FIG. 8.

Figure 4A:
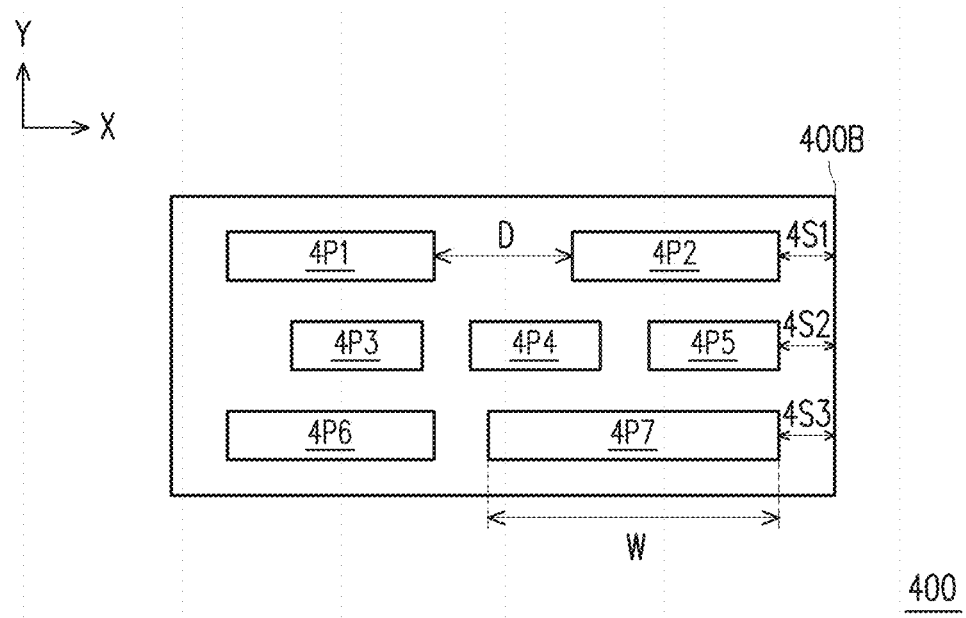
FIGS. 4A and 4B are depictions of a layout of a cell at two stages of updating a boundary spacing configuration, in accordance with some embodiments.
Figure 4B:
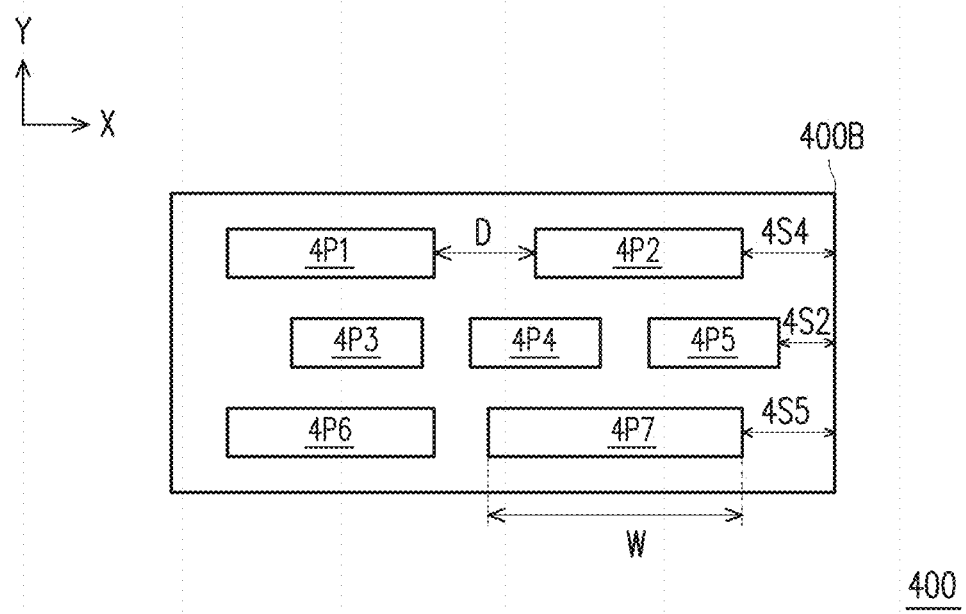

FIGS. 4A and 4B are depictions of a non-limiting example of a layout of a cell 400 at two stages of updating a boundary spacing configuration by executing one or more operations of method 300, in some embodiments. Cell 400 is simplified for the purpose of clarity. In various embodiments, cell 400 includes features in addition to those depicted in FIGS. 4A and 4B, e.g., one or more transistor elements, power rails, isolation structures, or the like. Each of FIGS. 4A and 4B further depicts directions X and Y.

In the non-limiting example depicted in FIGS. 4A and 4B, updating a boundary spacing configuration is based on modifying a boundary pin along the X direction. In some embodiments, updating a boundary spacing configuration is based on modifying a boundary pin along the Y direction.

At operation 310, a pin in the cell is identified as a boundary pin. In some embodiments, identifying the pin as the boundary pin is based on a layout location of the pin within the cell. In some embodiments, identifying a pin as the boundary pin includes determining that a space between the pin and a boundary of the cell does not include another pin.

In some embodiments, identifying the pin as the boundary pin is based on a layout location of the pin relative to a single boundary of the cell. In some embodiments, identifying the pin as the boundary pin is based on a layout location of the pin relative to more than one boundary of the cell.

In some embodiments, e.g., embodiments in which method 300 is used as operation 520 or 540 of method 500, discussed below with respect to FIGS. 5 and 6, identifying the pin as the boundary pin is based on a layout location of the pin relative to a target pin in a neighboring cell.

In some embodiments, identifying the pin as the boundary pin is based on the pin aligning with a target pin in a neighboring cell. In some embodiments, identifying the pin as the boundary pin is based on the pin and a target pin in a neighboring cell being aligned to within a minimum spacing rule.

In some embodiments, identifying the pin as the boundary pin is based on a received identifier, e.g., an iteration counter, for the pin.

In some embodiments, e.g., embodiments in which method 300 is used as operation 115 of method 100, discussed above with respect to FIGS. 1-2J, identifying the pin as the boundary pin is based on an iterative process for sequentially identifying each pin of a plurality of pins in the cell as a potential boundary pin.

In some embodiments, identifying the pin as the boundary pin includes identifying pin PA2 in first cell 200A, discussed above with respect to FIGS. 1-2E. In some embodiments, identifying the pin as the boundary pin includes identifying pin PA5 in first cell 210A, discussed above with respect to FIGS. 1 and 2F-2J.

FIG. 4A depicts a non-limiting example of cell 400 that includes seven pins 4P1-4P7 and a boundary 400B. Pins 4P1 and 4P2 are aligned in a top row along the X direction, pins 4P3-4P5 are aligned in a middle row along the X direction, and pins 4P6 and 4P7 are aligned in a bottom row along the X direction.

In the embodiment depicted in FIG. 4A, each of pins 4P2, 4P5, and 4P7 is a potential boundary pin relative to boundary 400B based on there being no other pin along the X direction between each of pins 4P1, 4P5, and 4P7 and boundary 400B. Pin 4P2 has a boundary spacing 4S1 relative to boundary 400B along the X direction, pin 4P5 has a boundary spacing 4S2 relative to boundary 400B along the X direction, and pin 4P7 has a boundary spacing 4S3 relative to boundary 400B along the X direction.

In some embodiments, additional criteria are used to identify a pin as a potential boundary pin. In some embodiments, a pin is identified as a potential boundary pin based on a feature other than another pin, e.g., a gate, active area, or fin structure, being between the pin and the boundary. In some embodiments, a pin is identified as a potential boundary pin based on a feature being located within a predetermined distance of the space between the pin and the boundary, e.g., a pin in an adjacent row.

At operation 320, a determination is made as to whether or not a boundary spacing of the boundary pin is capable of being increased. In some embodiments, determining whether or not the boundary spacing is capable of being increased is based on a threshold value for an amount of the increase in the boundary spacing.

In some embodiments, the threshold value is based on an initial value of the boundary spacing. In some embodiments, the threshold value is based on a predetermined minimum boundary spacing value. In some embodiments, the threshold value is based on a projected pin extension of a pin in a neighboring cell. In some embodiments, the threshold value is based on a minimum edge-to-edge spacing rule for the conductive layer in which the pin is positioned.

In some embodiments, determining whether or not the boundary spacing is capable of being increased does not include a threshold value, and any increase in the boundary spacing is sufficient to conclude that the boundary spacing is capable of being increased.

In some embodiments, determining whether or not the boundary spacing is capable of being increased includes determining whether or not the boundary pin is capable of being shortened. In some embodiments, determining whether or not the boundary spacing is capable of being increased includes determining whether or not the boundary pin is capable of being shifted away from the boundary.

In some embodiments, determining whether or not the boundary spacing is capable of being increased includes determining whether or not a pin aligned with the boundary pin is capable of being shortened. In some embodiments, determining whether or not the boundary spacing is capable of being increased includes determining whether or not a pin aligned with the boundary pin is capable of being shifted away from the boundary.

In some embodiments, determining whether or not the boundary spacing is capable of being increased includes determining whether or not a cell feature other than another pin, e.g., a gate, active area, or fin structure, is capable of being modified. In some embodiments, determining whether or not the boundary spacing is capable of being increased includes determining whether or not a cell feature other than another pin, e.g., a gate, active area, or fin structure, or another pin aligned with the boundary pin is capable of being shifted away from the boundary pin or another pin aligned with the boundary pin.

In some embodiments, determining whether or not the boundary spacing is capable of being increased includes a combination of the criteria discussed above. In some embodiments, determining whether or not the boundary spacing is capable of being increased is based on one or more layout rules for the cell. In some embodiments, determining whether or not the boundary spacing is capable of being increased is based on layout rules 820 of IC layout generation system 800, discussed below with respect to FIG. 8.

At operation 330, based on a determination that the boundary spacing of the boundary pin is capable of being increased, the cell is modified by increasing the boundary spacing of the boundary pin. In some embodiments, modifying the cell includes increasing a single boundary spacing of a single boundary pin. In some embodiments, modifying the cell includes increasing more than one boundary spacing of a single boundary pin. In some embodiments, modifying the cell includes increasing one or more boundary spacing of each boundary pin of a plurality of boundary pins.

In some embodiments, modifying the cell includes increasing the boundary spacing of the boundary pin by an amount equal to a threshold value. In some embodiments, modifying the cell includes increasing the boundary spacing of the boundary pin by an amount greater than a threshold value. In some embodiments, modifying the cell includes increasing the boundary spacing of the boundary pin by a maximum amount based on one or more layout rules, e.g., layout rules 820 of IC layout generation system 800, discussed below with respect to FIG. 8.

In some embodiments, increasing the boundary spacing of the boundary pin includes one or both of shortening the boundary pin or shifting the boundary pin away from the boundary. In some embodiments, increasing the boundary spacing of the boundary pin includes one or both of shortening another pin aligned with the boundary pin or shifting the other pin away from the boundary.

In some embodiments, increasing the spacing of the boundary pin includes modifying or shifting a cell feature other than another pin, e.g., a gate, active area, or fin structure. In some embodiments, increasing the spacing of the boundary pin includes a combination of the embodiments discussed above. In some embodiments, increasing the spacing of the boundary pin includes prioritizing among the embodiments discussed above.

FIG. 4B depicts a non-limiting example in which cell 400 is modified based on determinations that boundary spacings 4S1 and 4S3, depicted in FIG. 4A, are capable of being increased and that boundary spacing 4S2 is not capable of being increased.

Boundary spacing 4S1 is determined to be capable of being increased by shifting pin 4P2 along the X direction away from boundary 400B based on pin 4P2 initially being separated from pin 4P1 along the X direction by a distance D that exceeds a minimum spacing rule for the conductive layer in which pins 4P1 and 4P2 are positioned. Based on the determination that boundary spacing 4S1 is capable of being increased, cell 400 is modified so that pin 4P2 has a boundary spacing 4S4 greater than boundary spacing 4S1, relative to boundary 400B along the X direction.

In some embodiments, pin 4P2 is shifted along the X direction away from boundary 400B so that boundary spacing 4S4 has a value equal to a threshold based on a projected pin extension of a pin in a neighboring cell (not shown), distance D thereby continuing to have a value that exceeds the minimum spacing rule. In some embodiments, pin 4P2 is shifted along the X direction away from boundary 400B so that distance D has a value that equals a minimum spacing rule, boundary spacing 4S4 thereby having a value greater than the threshold.

Boundary spacing 4S2 is determined to be incapable of being increased based on widths (not labeled) along the X direction of pins 4P3-4P5 and distances (not labeled) between pins 4P3-4P5 along the X direction. In some embodiments, boundary spacing 4S2 is determined to be incapable of being increased based on the widths of pins 4P3-4P5 having a value equal to a minimum width rule and the spacing between pins 4P3-4P5 being equal to a minimum spacing rule. In some embodiments, boundary spacing 4S2 is determined to be incapable of being increased based on an aggregate difference between the widths of pins 4P3-4P5 and the minimum width rule plus an aggregate difference between the pin 4P3-4P5 spacings and the minimum spacing rule being less than a threshold value.

Boundary spacing 4S3 is determined to be capable of being increased by shortening pin 4P7 along the X direction so as to move the edge closest to boundary 400B away from boundary 400B, based on pin 4P7 initially having a width W greater than a minimum width rule. Based on the determination that boundary spacing 4S3 is capable of being increased, cell 400 is modified so that pin 4P7 has a boundary spacing 4S5, greater than boundary spacing 4S3, relative to boundary 400B along the X direction.

In some embodiments, pin 4P7 is shortened away from boundary 400B along the X direction so that boundary spacing 4S5 has a value equal to a threshold based on a projected pin extension of a pin in a neighboring cell (not shown), the width W thereby continuing to have a value that exceeds the minimum width rule. In some embodiments, pin 4P7 is shortened away from boundary 400B along the X direction so that width W has a value that equals the minimum width rule, boundary spacing 4S5 thereby having a value greater than the threshold.

In some embodiments, based on a determination that the boundary spacing of the boundary pin is capable of being increased, modifying the cell includes adding or modifying a status indicator of the cell corresponding to the modification.

In some embodiments, based on a determination that the boundary spacing of the boundary pin is not capable of being increased, the cell is modified by adding or modifying a status indicator of the cell corresponding to the determination.

In some embodiments, based on a determination that the boundary spacing of the boundary pin is not capable of being increased, method 300 returns to operation 310 and another pin is identified as a boundary pin. In some embodiments, whether or not the boundary spacing of the boundary pin is determined to be capable of being increased, method 300 returns to operation 310 and another pin is identified as a boundary pin.

In some embodiments, method 300 returns to operation 310 and another pin is identified as a boundary pin for each pin in the cell. In some embodiments, method 300 returns to operation 310 and another pin is identified as a boundary pin for each pin in a subset of the pins in the cell. In some embodiments, method 300 returns to operation 310 and another pin is identified as a boundary pin for each pin in the cell or in a subset of the pins in the cell until a boundary spacing corresponding to at least one pin is determined to be capable of being increased.

At optional operation 340, the cell is saved to a storage device. In some embodiments, the cell is saved to a cell library.

In some embodiments, the cell is saved conditioned on the cell being modified by increasing the boundary spacing of at least one pin in the cell. In some embodiments, the cell is saved whether or not the cell is modified by increasing the boundary spacing of at least one pin in the cell.

By executing the operations of method 300 to update a boundary spacing configuration of a cell, an IC layout including the updated cell is capable of having an adjacent cell modified to have a pin extend into the cell, thereby increasing overall routing flexibility for a semiconductor structure as described above with respect to method 100.

Figure 5:
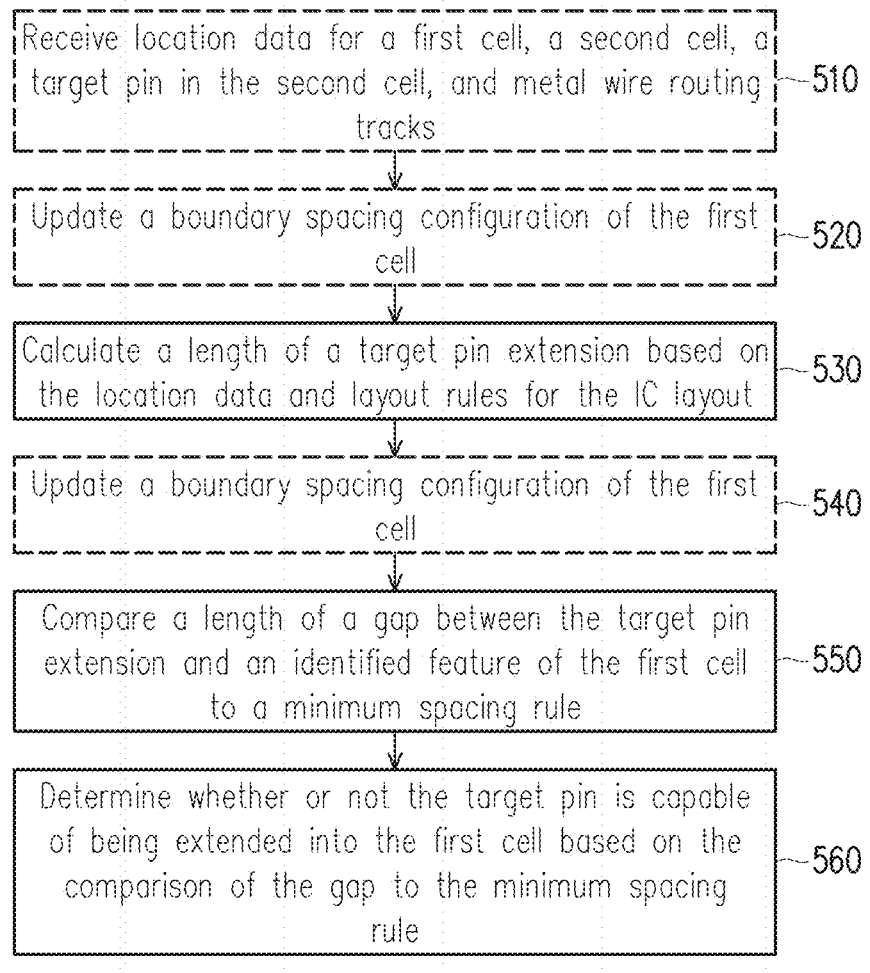
FIG. 5 is a flowchart of a method of determining a target pin extendibility into an adjacent cell, in accordance with some embodiments.

FIG. 5 is a flowchart of a method 500 of determining target pin extendibility, in accordance with some embodiments. Method 500 is usable as operation 135 of method 100, discussed above with respect to FIGS. 1-2J.

The operations of method 500 are capable of being performed as part of a method of forming a semiconductor structure. In some embodiments, forming the semiconductor structure is part of forming one or more semiconductor devices, non-limiting examples of which include memory circuits, logic devices, processing devices, signal processing circuits, and the like.

In some embodiments, some or all of the operations of method 500 are capable of being performed as part of an APR method. In some embodiments, some or all of the operations of method 500 are capable of being performed by an APR system.

In some embodiments, the operations of method 500 are performed in the order depicted in FIG. 5. In some embodiments, the operations of method 500 are performed in an order other than the order depicted in FIG. 5. In some embodiments, one or more operations are performed before, between, during, and/or after performing one or more operations of method 500.

In some embodiments, some or all of method 500 is executed by a processor of a computer. In some embodiments, some or all of method 500 is executed by a processor 802 of IC layout generation system 800, discussed below with respect to FIG. 8.

Figure 6:
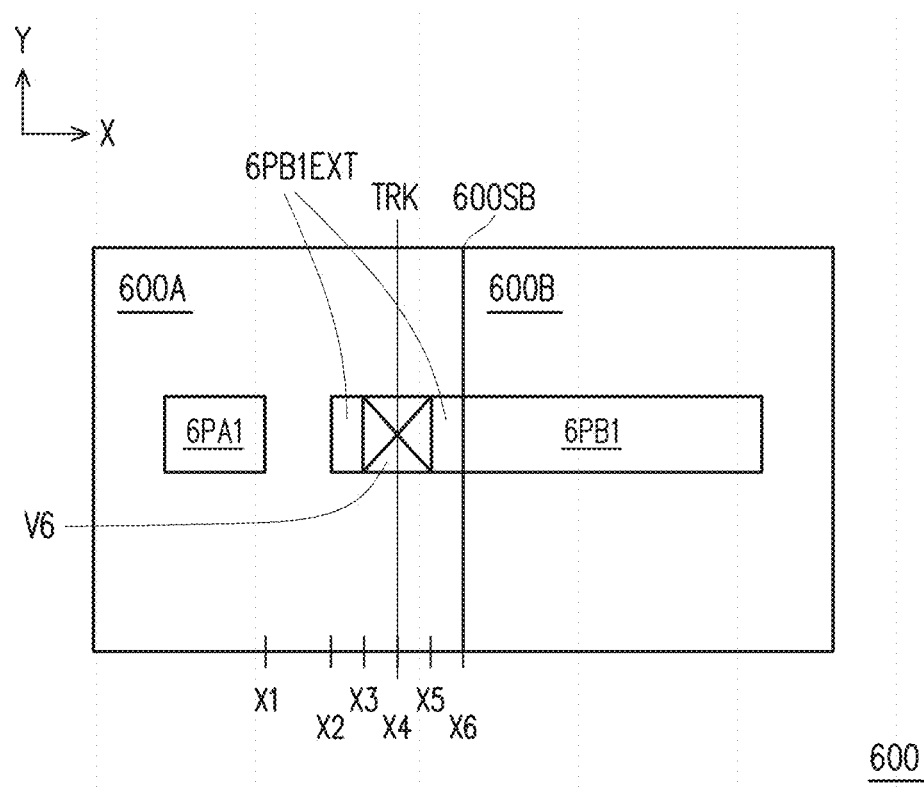
FIG. 6 is a diagram of an IC layout, in accordance with some embodiments.

FIG. 6 is a depiction of a non-limiting example of an IC layout in which a determination is made as to whether or not a target pin is capable of being extended into an adjacent cell by executing one or more operations of method 500, in some embodiments. IC layout 600 is simplified for the purpose of clarity. In various embodiments, IC layout 600 includes features in addition to those depicted in FIG. 6, e.g., one or more transistor elements, power rails, isolation structures, or the like. FIG. 6 further depicts directions X and Y.

In the non-limiting example depicted in FIG. 6, determining whether or not a target pin is capable of being extended into an adjacent cell is based on extending a target pin along the X direction. In some embodiments, determining whether or not a target pin is capable of being extended into an adjacent cell is based on extending a target pin along the Y direction.

At optional operation 510, in some embodiments, location data for a first cell, a second cell, a target pin in the second cell, and metal wire routing tracks are received. The location data include the location of a boundary shared by the first and second cells and the location of a metal wire routing track closest to the shared boundary.

In some embodiments, receiving the location data includes receiving location data for first cell 200A, second cell 200B, and track T5, discussed above with respect to FIGS. 1-2E. In some embodiments, receiving the location data includes receiving location data for first cell 210A, second cell 210B, and track T15, discussed above with respect to FIGS. 1 and 2F-2J.

In some embodiments, the first cell and the second cell correspond to one or more layouts 822 of IC layout generation system 800, discussed below with respect to FIG. 8. In some embodiments, receiving the location data includes receiving location data 824 of IC layout generation system 800, discussed below with respect to FIG. 8.

FIG. 6 depicts a non-limiting example of an IC layout 600 that includes a first cell 600A including a pin 6PA1, a second cell 600B including a pin 6PB1, a shared boundary 600SB, and a track TRK. An extension 6PB1EXT of pin 6PB1 extends into first cell 600A, and a via V6 overlies extension 6PB1EXT. Locations X1-X6 depict locations along the X direction.

Pin 6PA1 has a rightmost edge at location X1 and extension 6PB1EXT has a leftmost edge at location X2. Extension 6PB1EXT has a rightmost edge at location X6 and pin 6PB1 has a leftmost edge at location X6.

Track TRK and via V6 are positioned at location X4 and shared boundary 600SB is positioned at location X6. In the embodiment depicted in FIG. 6, location X4 is offset to the left of location X6. In some embodiments, location X4 is offset to the right of location X6. In some embodiments, locations X4 and X6 are a same location.

Via V6 has a leftmost edge at location X3 and a rightmost edge at location X5. The distance between locations X2 and X3 is a via enclosure spacing. In some embodiments, the via enclosure spacing is based on a minimum via enclosure spacing rule for the conductive layer in which pin 6PP1 is positioned.

In the embodiment depicted in FIG. 6, each of locations X3 and X5 is offset to the left of location X6. In some embodiments, location X4 is offset from location X6 such that location X3 is offset to the left of location X6 and location X5 is offset to the right of location X6. In some embodiments, location X4 is offset from location X6 such that each of locations X3 and X5 is offset to the right of location X6. In some embodiments, location X4 is offset from location X6 such that one of locations X3 or X5 is a same location as location X6.

At optional operation 520, in some embodiments, a boundary spacing configuration of the first cell is updated. In some embodiments, updating the boundary spacing configuration of the first cell includes increasing a spacing between a pin in the first cell and a boundary of the first cell. In some embodiments, updating the boundary spacing configuration of the first cell includes performing one or more operations of method 300, discussed above with respect to FIG. 3.

In some embodiments, updating the boundary spacing configuration of the first cell includes increasing a spacing between locations X1 and X6 depicted in FIG. 6.

At operation 530, a length of a target pin extension is calculated based on the location data and layout rules for the IC layout. Calculating the length of the target pin extension includes calculating a minimum distance the target pin is required to extend into the first cell so that an electrical connection is capable of being formed at a location of the track closest to the shared border. In some embodiments, calculating the length of the target pin extension is based on one or more of a via size, an end-to-end spacing rule, or a via enclosure spacing rule.

In some embodiments, calculating the length of the target pin extension is based on one or more of layout rules 820, one or more layouts 822, or location data 824 of IC layout generation system 800, discussed below with respect to FIG. 8.

In the embodiment depicted in FIG. 6, extension 6PB1EXT has a length equal to the distance between locations X2 and X6. The extension length is therefore the sum of the via enclosure spacing from location X2 to location X3, a width of via V6 extending from location X3 to X5, and a distance between locations X5 and X6 based on the width of via V6 and the offset of location X4 relative to location X6.

In some embodiments in which location X5 is offset to the right of or is the same as location X6, the extension length does not include the distance between locations X5 and X6. In some embodiments in which location X3 is offset to the left of location X6 and location X5 is offset to the right of location X6, the extension length includes a portion of the width of via V6 extending from location X3 to location X6. The size of the portion is based on the width of via V6 and the size and direction of the offset between locations X4 and X6.

In some embodiments in which location X3 is the same as location X6, the extension length is equal to the via enclosure spacing from location X2 to location X3. In some embodiments in which location X3 is offset to the right of location X6, the extension length is equal to a portion of the via enclosure spacing from location X2 to location X6. The size of the portion is based on the via enclosure spacing, the width of the via, and the size and direction of the offset between locations X4 and X6.

In some embodiments, the size of the offset between locations X4 and X6 is less than or equal to a predetermined distance based on the via enclosure spacing, i.e., the distance from location X2 to location X3, summed with one half of the width of via V6, i.e., the distance from location X4 to either of locations X3 and X5. In some embodiments, the size of the offset between locations X4 and X6 is less than or equal to the predetermined distance being equal to the via enclosure spacing summed with one half of the width of via V6. In some embodiments, the size of the offset between locations X4 and X6 is less than or equal to the predetermined distance being less than the via enclosure spacing summed with one half of the width of via V6.

In some embodiments, a size of the offset between locations X4 and X6 being greater than the predetermined distance represents track TRK being positioned at location X4 sufficiently far from shared boundary 600SB at location X6 for via V6 to be capable of overlying pin 6PA1 such that extension 6PB1EXT is not needed. In some embodiments, a size of the offset between locations X4 and X6 being greater than the predetermined distance represents track TRK being positioned at location X4 sufficiently far from shared boundary 600SB at location X6 for via V6 to be capable of overlying pin 6PB1 such that extension 6PB1EXT is not needed.

At optional operation 540, in some embodiments, a boundary spacing configuration of the first cell is updated. In some embodiments, updating the boundary spacing configuration of the first cell includes increasing a spacing between a pin in the first cell and a boundary of the first cell. In some embodiments, updating the boundary spacing configuration of the first cell is based on a position of the target pin in the second cell.

In some embodiments, updating the boundary spacing configuration of the first cell includes performing one or more operations of method 300, discussed above with respect to FIG. 3.

In some embodiments, updating the boundary spacing configuration of the first cell includes increasing a spacing between locations X1 and X6 depicted in FIG. 6.

At operation 550, a length of a gap between the target pin extension and an identified feature of the first cell is compared to a minimum spacing rule. In some embodiments, comparing the gap to the minimum spacing rule includes comparing the gap between the target pin extension and an identified boundary pin in the first cell.

In some embodiments, comparing the gap to the minimum spacing rule includes comparing the target pin extension to a feature, e.g., a pin, in the first cell aligned with the target pin extension along the X direction. In some embodiments, comparing the gap to the minimum spacing rule includes comparing the target pin extension to a feature, e.g., a pin, in the first cell aligned with the target pin extension along the Y direction.

In some embodiments, the gap is one gap of a plurality of gaps based on a plurality of features in the first cell, and comparing the gap to the minimum spacing rule includes comparing each gap of the plurality of gaps to one or more minimum spacing rules. In some embodiments, comparing the gap to the minimum spacing rule includes comparing the target pin location to a rule other than a minimum spacing rule, e.g., a rule based on a defined region in a layout.

In the embodiment depicted in FIG. 6, a gap between extension 6PB1EXT and pin 6PA1 has a length along the X direction equal to the distance between locations X1 and X2. Comparing the gap to the minimum spacing rule includes comparing the gap to a minimum end-to-end spacing rule for the conductive layer in which pins 6PA1 and 6PB1 are positioned.

At operation 560, a determination is made as to whether or not the target pin is capable of being extended into the first cell based on the comparison of the gap to the minimum spacing rule. If the gap is greater than or equal to the minimum spacing rule, the target pin is determined to be capable of being extended into the first cell. If the gap is less than the minimum spacing rule, the target pin is determined to be incapable of being extended into the first cell.

In the embodiment depicted in FIG. 6, pin 6PB1 is determined to be capable of being extended into cell 600A if the distance between locations X1 and X2 is greater than or equal to the minimum end-to-end spacing rule for the conductive layer in which pins 6PA1 and 6PB1 are positioned. Pin 6PB1 is determined to be incapable of being extended into cell 600A if the distance between locations X1 and X2 is less than the minimum end-to-end spacing rule for the conductive layer in which pins 6PA1 and 6PB1 are positioned.

By executing the operations of method 500 to determine extendibility of a target pin in a cell, an IC layout including the target pin facilitates routing of electrical connections to the cell compared to routing of electrical connections to cells that do not include an extended target pin, thereby increasing overall routing flexibility for a semiconductor structure as described above with respect to method 100.

Figure 7A:
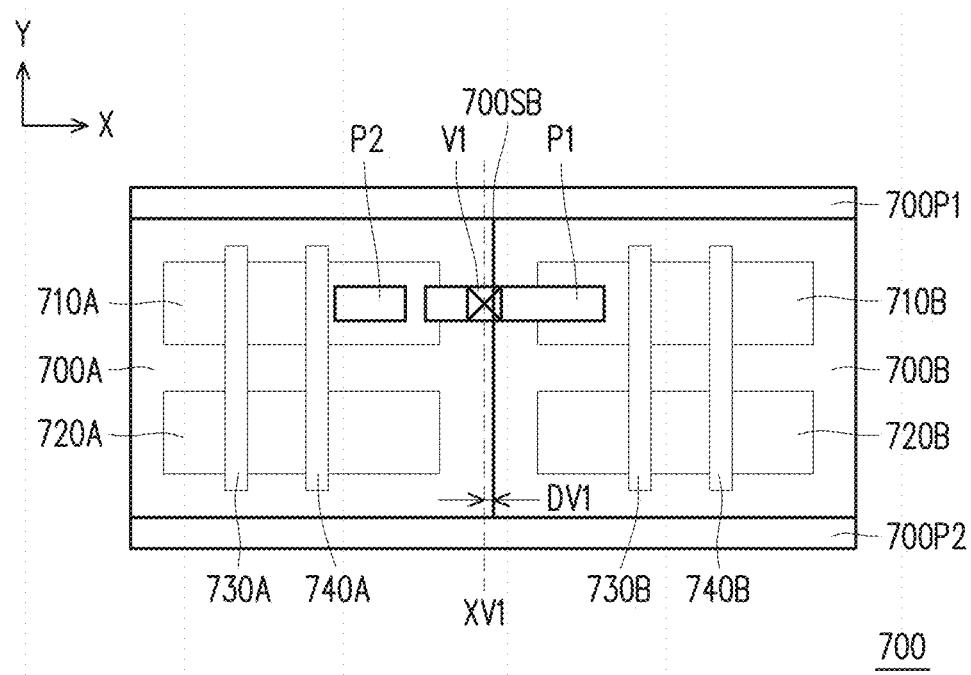
FIGS. 7A and 7B are diagrams of a semiconductor structure, in accordance with some embodiments.
Figure 7B:
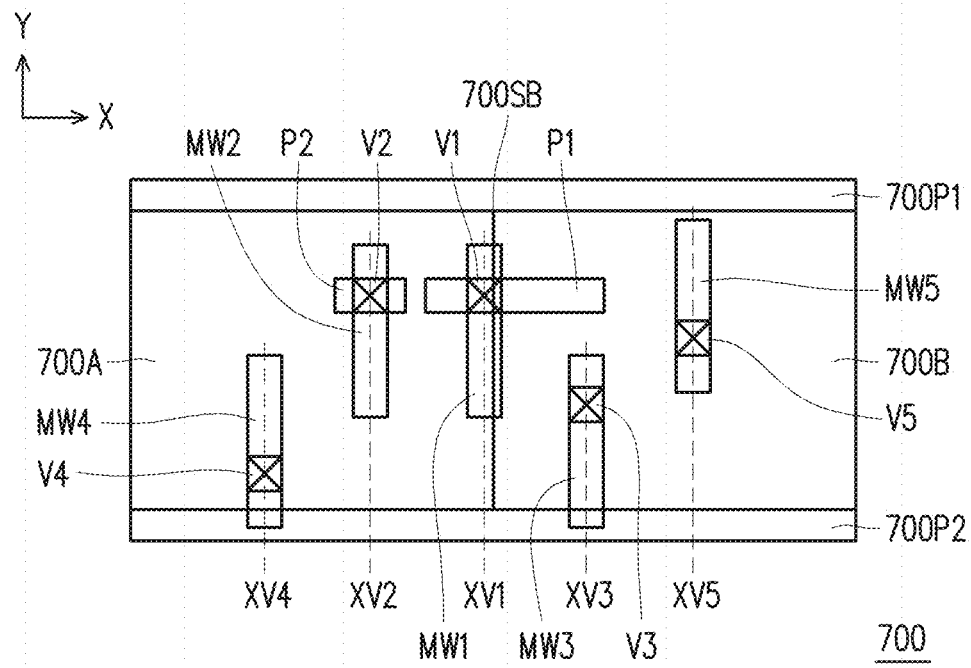

FIGS. 7A and 7B are diagrams of a semiconductor structure 700, in accordance with some embodiments. Semiconductor structure 700 is formed by executing some or all of the operations of methods 100, 300, and 500, and is configured in accordance with IC layouts 200 and 600 and cell 400, discussed above with respect to FIGS. 1-6.

The depictions of semiconductor structure 700 in FIGS. 7A and 7B are simplified for the purpose of clarity. FIGS. 7A and 7B depict plan views of semiconductor structure 700 with various features included and excluded to facilitate the discussion below. In various embodiments, semiconductor structure 700 includes one or more gate structures or other transistor elements, wells, isolation structures, or the like. FIGS. 7A and 7B further depict directions X and Y. Semiconductor structure 700 includes a first device region 700A, a second device region 700B, a shared boundary 700SB, a first power rail 700P1, and a second power rail 700P2. In some embodiments, semiconductor structure 700 does not include one or both of first power rail 700P1 or second power rail 700P2.

First device region 700A includes first active areas 710A and 720A and first gate structures 730A and 740A. First active areas 710A and 720A and first gate structures 730A and 740A are contained entirely within first device region 700A and are configured as one or more logic devices capable of performing one or more logical functions.

First device region 700A corresponds to a layout cell, e.g., cell 200A, 400, or 600A, discussed above with respect to FIGS. 2A-2E, 4A, 4B, and 6.

Second device region 700B includes second active areas 710B and 720B and second gate structures 730A and 740A. Second active areas 710B and 720B and second gate structures 730B and 740B are contained entirely within second device region 700B and are configured as one or more logic devices capable of performing one or more logical functions.

Second device region 700B corresponds to a layout cell, e.g., cell 200B or 600B, discussed above with respect to FIGS. 2A-2E and 6.

Shared boundary 700SB separates first device region 700A from second device region 700B. Because first device region 700A contains the entireties of first active areas 710A and 720A and second device region 700B contains the entireties of second active areas 710B and 720B, shared boundary 700SB is free from intersecting each of first active areas 710A and 720A and second active areas 710B and 720B.

In the embodiment depicted in FIGS. 7A and 7B, shared boundary 700SB is a straight line oriented in the Y direction. In some embodiments shared boundary 700SB is a straight line oriented in the X direction.

Semiconductor structure 700 further includes a first metal zero pin P1 and a second metal zero pin P2. In some embodiments, semiconductor structure 700 does not include second metal zero pin P2.

In some embodiments, one or both of first metal zero pin P1 or second metal zero pin P2 includes a metal-zero-over-oxide-layer. In some embodiments, one or both of first metal zero pin P1 or second metal zero pin P2 includes a metal-zero-over-poly-layer. In some embodiments, one or both of first metal zero pin P1 or second metal zero pin P2 includes both a metal-zero-over-oxide-layer and a metal-zero-over-poly-layer.

First metal zero pin P1 is positioned partially within first device region 700A, partially within second device region 700B, and extends across shared boundary 700SB. In the embodiment depicted in FIG. 7A, first metal zero pin P1 is configured to electrically connect to second active area 710B. In various embodiments, first metal zero pin P1 is configured to electrically connect to one or more other features in second device region 700B other than or in addition to active area 710B.

In the embodiment depicted in FIGS. 7A and 7B, first metal zero pin P1 has a rectangular shape and is oriented along the X direction. In various embodiments, first metal zero pin P1 has a shape other than a rectangle oriented along the X direction and extends along the X direction so as to cross shared boundary 700SB.

In some embodiments, second metal zero pin P2 is positioned entirely within first device region 700A. In the embodiment depicted in FIG. 7A, second metal zero pin P2 is configured to electrically connect to first active area 710A. In various embodiments, second metal zero pin P2 is configured to electrically connect to one or more other features in first device region 700A other than or in addition to active area 710A.

In the embodiment depicted in FIGS. 7A and 7B, second metal zero pin P2 has a rectangular shape and is oriented along the X direction. In various embodiments, second metal zero pin P2 has a shape other than a rectangle and is positioned entirely within first device region 700A.

In the embodiment depicted in FIGS. 7A and 7B, first metal zero pin P1 corresponds to pin 6PB1 and extension 6PB1EXT, and second metal zero pin P2 corresponds to pin 6PA1, discussed above with respect to IC layout 600 and FIG. 6. Thus, first metal zero pin P1 and second metal zero pin P2 are configured to have alignment and spacing conforming to that of layout 600. Accordingly, first metal zero pin P1 and second metal zero pin P2 are separated by a distance (not labeled) equal to or greater than a metal zero minimum spacing rule.

A via V1 contacts first metal zero pin P1 and is centered at a location XV1 along the X direction. Location XV1 and shared boundary 700B are separated by a distance DV1.

Distance DV1 corresponds to the offset between locations X4 and X6, discussed above with respect to IC layout 600 and FIG. 6. Distance DV1 has a value less than or equal to a predetermined distance based on a metal zero minimum via enclosure length. In some embodiments, the predetermined distance is equal to half a width of via V1 plus the metal zero minimum via enclosure length. In some embodiments, the predetermined distance is less than half a width of via V1 plus the metal zero minimum via enclosure length.

A metal wire MW1 overlies via V1, is centered at location XV1, and is electrically connected to via V1. In some embodiments, metal wire MW1 is part of a first metal layer of a metal interconnect within semiconductor structure 700.

In some embodiments, metal wire MW1 is part of a metal layer of a metal interconnect other than metal one within semiconductor structure 700.

In the embodiment depicted in FIG. 7B, metal wire MW1 has a rectangular shape and is oriented along the Y direction. In some embodiments, metal wire MW1 has a shape other than a rectangle oriented along the Y direction and extends along the Y direction so as to be capable of forming an electrical connection to one or more overlying conductive elements.

In the embodiment depicted in FIG. 7B, each of via V1 and metal wire MW1 overlies first device region 700A, second device region 700B, and shared boundary 700SB. In some embodiments, each of via V1 and metal wire MW1 overlies only one of first device region 700A or second device region 700B, and does not overlie shared boundary SB. In some embodiments, each of via V1 and metal wire MW1 overlies only one of first device region 700A or second device region 700B, and is aligned with shared boundary SB.

In the embodiment depicted in FIG. 7B, semiconductor structure 700 includes vias V2-V5 and metal wires MW2-MW5, centered at respective locations XV2-XV5 along the X direction. Each of metal wires MW2-MW5 is electrically connected to a corresponding via V2-V5.

Locations XV1-XV5 correspond to tracks used for placement of vias and metal one wires, e.g., tracks T1-T10 of IC layout 200, discussed above with respect to FIGS. 2A-2E. Thus, locations XV1-XV5 define a pitch of metal wires MW1-MW5 corresponding to a metal one minimum spacing rule.

In the embodiment depicted in FIG. 7B, semiconductor structure 700 includes five each of vias V1-V5, metal wires MW1-MW5, and locations XV1-XV5. In some embodiments, semiconductor structure 700 includes fewer than five each of vias V1-V5, metal wires MW1-MW5, and locations XV1-XV5. In some embodiments, semiconductor structure 700 includes greater than five each of vias V1-V5, metal wires MW1-MW5, and locations XV1-XV5.

In the embodiment depicted in FIGS. 7A and 7B, semiconductor structure 700 is based on IC layout 200, in which a shared boundary extends along the Y direction. In some embodiments, a semiconductor structure is based on IC layout 210, in which a shared boundary extends along the X direction.

By being manufactured through execution of some or all of the operations of methods 100, 300, and 500, and being configured in accordance with IC layouts 200 or 210, IC layout 600, and cell 400, discussed above with respect to FIGS. 1-6, semiconductor structure 700 enables the realization of the advantages discussed above with respect to methods 100, 300, and 500, and FIGS. 1-6.

Figure 8:
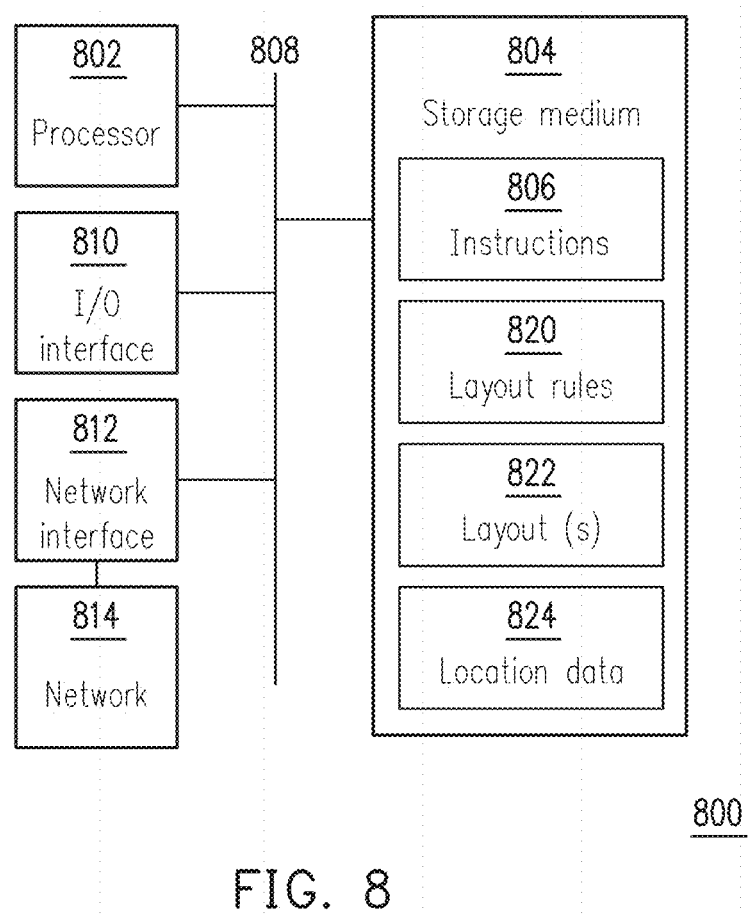
FIG. 8 is a schematic view of an IC layout generation system, in accordance with some embodiments.

FIG. 8 is a schematic view of an IC layout generation system 800, in accordance with some embodiments. In some embodiments, IC layout generation system 800 is usable as part of a design house 920 of an IC manufacturing system 900, discussed below with respect to FIG. 9. In some embodiments, IC layout generation system 800 is capable of performing some or all of the operations of method 100, discussed above with respect to FIG. 1, some or all of method 300, discussed above with respect to FIG. 3, and/or some or all of method 500, discussed above with respect to FIG. 5.

IC layout generation system 800 includes a hardware processor 802 and a non-transitory, computer readable storage medium 804 encoded with, i.e., storing, the computer program instructions 806, i.e., a set of executable instructions. Instructions 806 include instructions for generating IC layouts for an IC manufacturing system. The processor 802 is electrically coupled with the computer readable storage medium 804 via a bus 808. The processor 802 is also electrically coupled with an I/O interface 810 by bus 808. A network interface 812 is also electrically connected to the processor 802 via bus 808. Network interface 812 is connected to a network 814, so that processor 802 and computer readable storage medium 804 are capable of connecting to external elements via network 814. The processor 802 is configured to execute the computer program instructions 806 encoded in the computer readable storage medium 804 in order to cause IC layout generation system 800 to be usable for performing a portion or all of the operations as described in methods 100, 300, and 500.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device) for storing instructions and/or data in a non-transitory manner. For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the computer readable storage medium 804 stores the computer program instructions 806 configured to cause IC layout generation system 800 to perform a portion or all of methods 100, 300, and 500. In some embodiments, the computer readable storage medium 804 also stores information needed for performing methods 100, 300, and/or 500 as well as information generated during the performance of the methods 100, 300, and/or 500, such as one or more layout rules 820, one or more layouts 822, location data 824, and/or instructions 806 to perform one or more operations of methods 100, 300, and 500.

I/O interface 810 is coupled with external circuitry. In some embodiments, I/O interface 810 includes a keyboard, keypad, mouse, trackball, trackpad, and/or cursor direction keys for communicating information and/or commands to processor 802. In some embodiments, I/O interface 810 includes a display, signal light, and/or audio device for communicating information from processor 802.

Network interface 812 allows IC layout generation system 800 to communicate with network 814, to which one or more other computer systems are connected. Network interface 812 includes wireless network interfaces such as BLUETOOTH, WIFI, WIMAX, GPRS, or WCDMA; or wired network interface such as ETHERNET, USB, or IEEE-1394. In some embodiments, one or more of methods 100, 300, or 500 is implemented in two or more IC layout generation systems 800, and information such as one or more layout rules 820, one or more layouts 822, or location data 824 are exchanged between different systems 800 via network 814.

IC layout generation system 800 is configured to receive information related to generating IC layouts. The information is transferred to processor 802 via bus 808 and is then stored in computer readable storage medium 804 as one or more layout rules 820, one or more layouts 822, location data 824, or instructions 806. In some embodiments, the one or more layout rules 820 are accessed in operation 105 (FIG. 1) and/or method 300 (FIG. 3) and/or method 500 (FIG. 5). In some embodiments, the one or more layouts 822 are accessed in operations 110 and 120 (FIG. 1) and/or method 300 (FIG. 3) and/or method 500 (FIG. 5). In some embodiments, the location data 824 are accessed in one or more of operations 125-155 (FIG. 1) and/or operation 510 (FIG. 5).

By being configured to execute a portion or all of methods 100, 300, and 500, IC layout generation system 800 enables the realization of the advantages discussed above with respect to methods 100, 300, and 500, and FIGS. 1-6.

Figure 9:
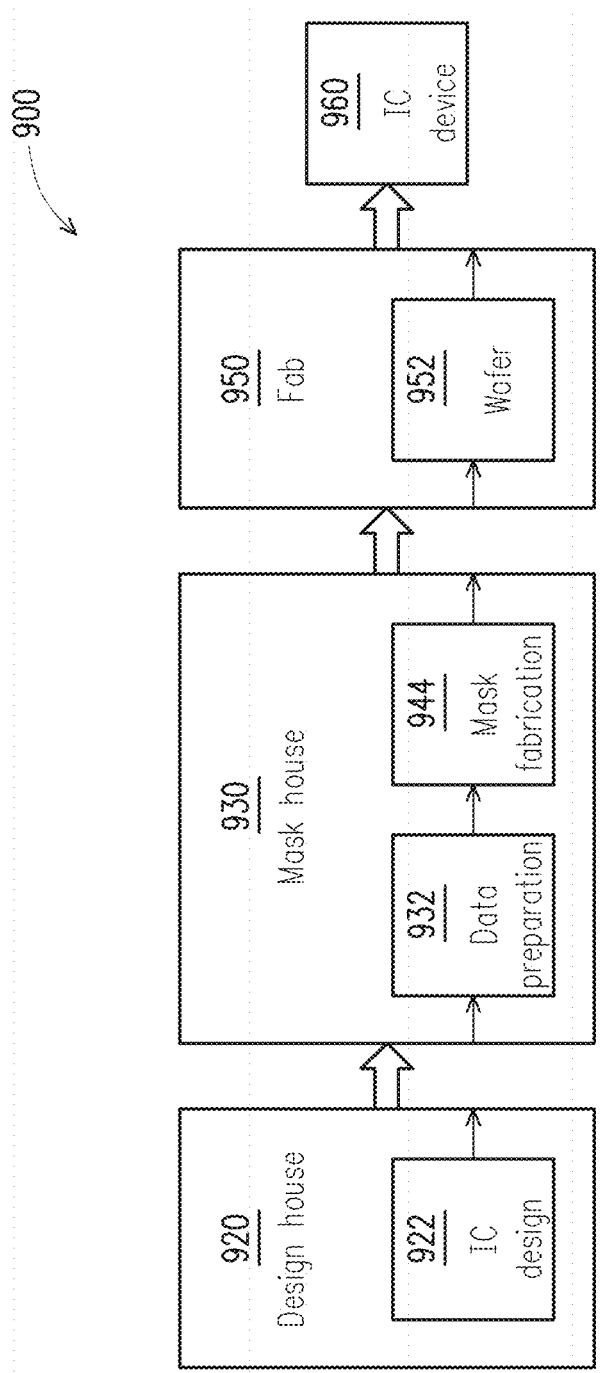
FIG. 9 is a depiction of an IC manufacturing system and an IC manufacturing flow associated therewith, in accordance with some embodiments.

FIG. 9 is a block diagram of IC manufacturing system 900, and an IC manufacturing flow associated therewith, in accordance with some embodiments.

In general, system 900 generates a layout (e.g., any one of IC layout 200, discussed above with respect to FIGS. 1-2E, layout 210, discussed above with respect to FIGS. 1 and 2F-2J, layout 600, discussed above with respect to FIGS. 5 and 6, or cell 400, discussed above with respect to FIGS. 3-4B, or the like). Based on the layout, system 900 fabricates at least one of (A) one or more semiconductor masks or (B) at least one component in a layer of an inchoate semiconductor integrated circuit.

In FIG. 9, IC manufacturing system 900 includes entities, such as design house 920, a mask house 930, and an IC manufacturer/fabricator ("fab") 950, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 950 is owned by a single larger company. In some embodiments, two or more of design house 920, mask house 930, and IC fab 950 coexist in a common facility and use common resources.

Design house (or design team) 920 generates an IC design layout 922. IC design layout 922 includes various geometrical patterns designed for an IC device 960. The geometrical patterns correspond to patterns of metal, oxide, or semiconductor layers that make up the various components of IC device 960 to be fabricated. The various layers combine to form various IC features. For example, a portion of IC design layout 922 includes various IC features, such as an active area, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout 922. The design procedure includes one or more of logic design, physical design or place and route. IC design layout 922 is presented in one or more data files having information of the geometrical patterns. For example, IC design layout 922 can be expressed in a GDSII file format or DFII file format.

Mask house 930 includes data preparation 932 and mask fabrication 944. Mask house 930 uses IC design layout 922 to manufacture one or more masks to be used for fabricating the various layers of IC device 960 according to IC design layout 922. Mask house 930 performs mask data preparation 932, where IC design layout 922 is translated into a representative data file ("RDF"). Mask data preparation 932 provides the RDF to mask fabrication 944. Mask fabrication 944 includes a mask writer. A mask writer converts the RDF to an image on a substrate, such as a mask (reticle) or a semiconductor wafer. The design layout is manipulated by mask data preparation 932 to comply with particular characteristics of the mask writer and/or requirements of IC fab 950. In FIG. 9, mask data preparation 932 and mask fabrication 944 are illustrated as separate elements. In some embodiments, mask data preparation 932 and mask fabrication 944 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects or the like. OPC adjusts IC design layout 922. In some embodiments, mask data preparation 932 includes further resolution enhancement techniques (RET), such as off-axis illumination, sub-resolution assist features, phase-shifting masks, other suitable techniques, or the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, or the like. In some embodiments, the MRC modifies the IC design layout to compensate for limitations during mask fabrication 944, which may undo part of the modifications performed by OPC in order to meet mask creation rules.

In some embodiments, mask data preparation 932 includes lithography process checking (LPC) that simulates processing that will be implemented by IC fab 950 to fabricate IC device 960. LPC simulates this processing based on IC design layout 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, or the like or combinations thereof. In some embodiments, after a simulated manufactured device has been created by LPC, if the simulated device is not close enough in shape to satisfy design rules, OPC and/or MRC are be repeated to further refine IC design layout 922.

It should be understood that the above description of mask data preparation 932 has been simplified for the purpose of clarity. In some embodiments, data preparation 932 includes additional features such as a logic operation (LOP) to modify the IC design layout according to manufacturing rules. Additionally, the processes applied to IC design layout 922 during data preparation 932 may be executed in a variety of different orders.

After mask data preparation 932 and during mask fabrication 944, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 944 is used in a variety of processes. For example, such a mask(s) is used in an ion implantation process to form various doped regions in the semiconductor wafer, in an etching process to form various etching regions in the semiconductor wafer, and/or in other suitable processes.

IC fab 950 is an IC fabrication business that includes one or more manufacturing facilities for the fabrication of a variety of different IC products. In some embodiments, IC Fab 950 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 950 uses the mask (or masks) fabricated by mask house 930 to fabricate IC device 960. Thus, IC fab 950 at least indirectly uses IC design layout 922 to fabricate IC device 960. In some embodiments, a semiconductor wafer 952 is fabricated by IC fab 950 using the mask (or masks) to form IC device 960. Semiconductor wafer 952 includes a silicon substrate or other proper substrate having material layers formed thereon. Semiconductor wafer further includes one or more of various doped regions, dielectric features, multilevel interconnects, or the like (formed at subsequent manufacturing steps).

Details regarding an integrated circuit (IC) manufacturing system (e.g., system 900, discussed above with respect to FIG. 9), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method of updating a boundary space configuration of an IC layout cell includes identifying a pin in the IC layout cell as a boundary pin, determining that a boundary spacing of the boundary pin is capable of being increased, and based on the determination that the boundary spacing of the boundary pin is capable of being increased, modifying the IC layout cell by increasing the boundary spacing of the boundary pin, wherein at least one of the identifying, determining, or modifying is executed by a processor of a computer. In some embodiments, identifying the pin in the IC layout cell as the boundary pin includes determining that a space between the pin and a boundary of the IC layout cell does not include another pin. In some embodiments, identifying the pin in the IC layout cell as the boundary pin is based on a layout location of the pin relative to a target pin in a neighboring IC layout cell. In some embodiments, determining that the boundary spacing of the boundary pin is capable of being increased is based on a threshold value of an amount of the increase in the boundary spacing. In some embodiments, determining that the boundary spacing of the boundary pin is capable of being increased includes one or more of determining that the boundary pin is capable of being shortened, determining that the boundary pin is capable of being shifted away from a boundary, determining that a pin aligned with the boundary pin is capable of being shortened, or determining that a pin aligned with the boundary pin is capable of being shifted away from a boundary. In some embodiments, increasing the boundary spacing of the boundary pin includes one or more of shortening the boundary pin, shifting the boundary pin away from a boundary, shortening a pin aligned with the boundary pin, or shifting a pin aligned with the boundary pin away from a boundary. In some embodiments, the method includes storing the modified IC layout cell in a storage device.

In some embodiments, a method of updating a boundary space configuration of an IC layout cell includes sequentially identifying each pin of a plurality of pins in the IC layout cell as a potential boundary pin, for each sequentially identified potential boundary pin of the plurality of boundary pins, determining whether or not the potential boundary pin is a boundary pin, when the potential boundary pin is determined to be a boundary pin, determining whether or not a boundary spacing of the boundary pin is capable of being increased, and when the boundary spacing of the boundary pin is determined to be capable of being increased, modifying the IC layout cell by increasing the boundary spacing of the boundary pin. At least one of the sequentially identifying, determining whether or not the potential boundary pin is a boundary pin, determining whether or not a boundary spacing of the boundary pin is capable of being increased, or modifying the IC layout cell is executed by a processor of a computer. In some embodiments, sequentially identifying each pin as the potential boundary pin is based on an iteration counter for the potential boundary pin. In some embodiments, any increase in the boundary spacing is sufficient to determine that the boundary spacing of the boundary pin is capable of being increased. In some embodiments, determining whether or not the boundary spacing of the boundary pin is capable of being increased includes one or more of determining whether or not the boundary pin is capable of being shortened, determining whether or not the boundary pin is capable of being shifted away from a boundary, determining whether or not a pin aligned with the boundary pin is capable of being shortened, or determining whether or not a pin aligned with the boundary pin is capable of being shifted away from a boundary. In some embodiments, increasing the boundary spacing of the boundary pin includes one or more of shortening the boundary pin, shifting the boundary pin away from a boundary, shortening a pin aligned with the boundary pin, or shifting a pin aligned with the boundary pin away from a boundary. In some embodiments, the method includes storing the modified IC layout cell in a cell library.

In some embodiments, an IC layout generation system includes a processor and a non-transitory, computer readable storage medium including computer program code for one or more programs. The non-transitory, computer readable storage medium and the computer program code are configured to, with the processor, cause the system to identify a pin in an IC layout cell as a boundary pin, determine that a boundary spacing of the boundary pin is capable of being increased to at least a threshold value, based on the determination that the boundary spacing of the boundary pin is capable of being increased to at least the threshold value, modify the IC layout cell by increasing the boundary spacing of the boundary pin to at least the threshold value, and store the modified IC layout cell in a storage device. In some embodiments, the non-transitory, computer readable storage medium and the computer program code are configured to, with the processor, cause the system to identify the boundary pin based on receiving an instruction from a user interface or network. In some embodiments, the threshold value is based on a projected pin extension of a pin in another IC layout cell. In some embodiments, the threshold value is based on a predetermined minimum boundary spacing value. In some embodiments, the threshold value is based on a minimum edge-to-edge spacing rule for a conductive layer in which the boundary pin is positioned. In some embodiments, the boundary pin is part of a metal zero layer of a manufacturing process, and the non-transitory, computer readable storage medium and the computer program code are configured to, with the processor, further cause the system to receive the IC layout cell free from the boundary pin spacing comprising a metal zero cut. In some embodiments, the non-transitory, computer readable storage medium and the computer program code are configured to, with the processor, cause the system to further modify the IC layout cell by adding or modifying a status indicator of the IC layout cell.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of updating a boundary space configuration of an integrated circuit (IC) layout cell, the method comprising:
   identifying a pin in the IC layout cell as a boundary pin;
   determining that a boundary spacing of the boundary pin is capable of being increased; and
   based on the determination that the boundary spacing of the boundary pin is capable of being increased, modifying the IC layout cell by increasing the boundary spacing of the boundary pin,
   wherein at least one of the identifying, determining, or modifying is executed by a processor of a computer.

2. The method of claim 1, wherein the identifying the pin in the IC layout cell as the boundary pin comprises determining that a space between the pin and a boundary of the IC layout cell does not include another pin.

3. The method of claim 1, wherein the identifying the pin in the IC layout cell as the boundary pin is based on a layout location of the pin relative to a target pin in a neighboring IC layout cell.

4. The method of claim 1, wherein the determining that the boundary spacing of the boundary pin is capable of being increased is based on a threshold value of an amount of the increase in the boundary spacing.

5. The method of claim 1, wherein the determining that the boundary spacing of the boundary pin is capable of being increased comprises one or more of
   determining that the boundary pin is capable of being shortened,
   determining that the boundary pin is capable of being shifted away from a boundary,
   determining that a pin aligned with the boundary pin is capable of being shortened, or
   determining that a pin aligned with the boundary pin is capable of being shifted away from a boundary.

6. The method of claim 1, wherein the increasing the boundary spacing of the boundary pin comprises one or more of
   shortening the boundary pin,
   shifting the boundary pin away from a boundary,
   shortening a pin aligned with the boundary pin, or
   shifting a pin aligned with the boundary pin away from a boundary.

7. The method of claim 1, further comprising storing the modified IC layout cell in a storage device.

8. A method of updating a boundary space configuration of an integrated circuit (IC) layout cell, the method comprising:
   sequentially identifying each pin of a plurality of pins in the IC layout cell as a potential boundary pin;
   for each sequentially identified potential boundary pin of the plurality of boundary pins, determining whether or not the potential boundary pin is a boundary pin;
   when the potential boundary pin is determined to be a boundary pin, determining whether or not a boundary spacing of the boundary pin is capable of being increased; and
   when the boundary spacing of the boundary pin is determined to be capable of being increased, modifying the IC layout cell by increasing the boundary spacing of the boundary pin,
   wherein at least one of the sequentially identifying, determining whether or not the potential boundary pin is a boundary pin, determining whether or not a boundary spacing of the boundary pin is capable of being increased, or modifying the IC layout cell is executed by a processor of a computer.

9. The method of claim 8, wherein the sequentially identifying each pin as the potential boundary pin is based on an iteration counter for the potential boundary pin.

10. The method of claim 8, wherein any increase in the boundary spacing is sufficient to determine that the boundary spacing of the boundary pin is capable of being increased.

11. The method of claim 8, wherein the determining whether or not the boundary spacing of the boundary pin is capable of being increased comprises one or more of
    determining whether or not the boundary pin is capable of being shortened,
    determining whether or not the boundary pin is capable of being shifted away from a boundary,
    determining whether or not a pin aligned with the boundary pin is capable of being shortened, or
    determining whether or not a pin aligned with the boundary pin is capable of being shifted away from a boundary.

12. The method of claim 8, wherein the increasing the boundary spacing of the boundary pin comprises one or more of
    shortening the boundary pin,
    shifting the boundary pin away from a boundary,
    shortening a pin aligned with the boundary pin, or
    shifting a pin aligned with the boundary pin away from a boundary.

13. The method of claim 8, further comprising storing the modified IC layout cell in a cell library.

14. An integrated circuit (IC) layout generation system comprising:
    a processor; and
    a non-transitory, computer readable storage medium including computer program code for one or more programs, the non-transitory, computer readable storage medium and the computer program code being configured to, with the processor, cause the system to:
    identify a pin in an IC layout cell as a boundary pin;
    determine that a boundary spacing of the boundary pin is capable of being increased to at least a threshold value;
    based on the determination that the boundary spacing of the boundary pin is capable of being increased to at least the threshold value, modify the IC layout cell by increasing the boundary spacing of the boundary pin to at least the threshold value; and
    store the modified IC layout cell in a storage device.

15. The IC layout generation system of claim 14, wherein the non-transitory, computer readable storage medium and the computer program code are configured to, with the processor, cause the system to identify the boundary pin based on receiving an instruction from a user interface or network.

16. The IC layout generation system of claim 14, wherein the threshold value is based on a projected pin extension of a pin in another IC layout cell.

17. The IC layout generation system of claim 14, wherein the threshold value is based on a predetermined minimum boundary spacing value.

18. The IC layout generation system of claim 14, wherein the threshold value is based on a minimum edge-to-edge spacing rule for a conductive layer in which the boundary pin is positioned.

19. The IC layout generation system of claim 14, wherein
    the boundary pin is part of a metal zero layer of a manufacturing process, and
    the non-transitory, computer readable storage medium and the computer program code are configured to, with the processor, further cause the system to receive the IC layout cell free from the boundary pin spacing comprising a metal zero cut.

20. The IC layout generation system of claim 14, wherein the non-transitory, computer readable storage medium and the computer program code are configured to, with the processor, cause the system to further modify the IC layout cell by adding or modifying a status indicator of the IC layout cell.

* * * * *